United States Patent
Tanaka

(10) Patent No.: US 7,855,943 B2
(45) Date of Patent: Dec. 21, 2010

(54) OPTICAL DISK DEVICE AND METHOD FOR PROCESSING OPTICAL DISK

(75) Inventor: Masami Tanaka, Ome (JP)

(73) Assignee: Kabushiki Kaisha Toshiba, Tokyo (JP)

(*) Notice: Subject to any disclaimer, the term of this patent is extended or adjusted under 35 U.S.C. 154(b) by 233 days.

(21) Appl. No.: 12/195,055

(22) Filed: Aug. 20, 2008

(65) Prior Publication Data

US 2009/0052290 A1 Feb. 26, 2009

(30) Foreign Application Priority Data

Aug. 24, 2007 (JP) ............................. 2007-218767

(51) Int. Cl.
*G11B 7/00* (2006.01)

(52) U.S. Cl. ............... 369/53.21; 369/53.22; 369/59.25

(58) Field of Classification Search ............... 369/47.1, 369/47.27, 53.22, 275.3, 59.25, 53.21; 713/193; 386/95
See application file for complete search history.

(56) References Cited

U.S. PATENT DOCUMENTS 7,380,137 B2* 5/2008 Bell et al. .................... 713/193
7,702,215 B2* 4/2010 Green ......................... 386/95

FOREIGN PATENT DOCUMENTS

JP 2006-050171 2/2006

* cited by examiner

*Primary Examiner*—Nabil Z Hindi
(74) *Attorney, Agent, or Firm*—Pillsbury Winthrop Shaw Pittman, LLP

(57) ABSTRACT

According to one embodiment, the invention provides an optical disk device having a drive and a control section. The drive applies recording processing and reproduction processing to an optical disk. When the optical disk is an unformatted blank medium, if the drive detects a medium ID and a medium key block region from the optical disk, the control section judges that there is copyright protection information and outputs display information which is used for the recording processing with respect to the optical disk together with display information showing the presence or absence of the copyright protection information.

15 Claims, 29 Drawing Sheets

| Selected format | Copyright protection information | Record format display | Description display | Medium identification display | |
|---|---|---|---|---|---|
| | | | | Single layer | Double layer |
| VR | Presence (CPRM) | VR format (digital broadcast can be recorded) | This disk can be reproduced only by apparatus compatible with reproduction of VR format. This disk is compatible with recording of digital broadcast program which can be recorded only once. | DVD (o) CPRM | DVD-DL (o) CPRM |
| | Absence | VR format (digital broadcast cannot be recorded) | Digital broadcast program which can be recorded only once cannot be recorded in this disk. This format can realize accurate reproduction of contents edited on HDD. | DVD (o) | DVD-DL (o) |
| HDVR | Presence (AACS) | HDVR format (digital broadcast can be recorded) | This disk can be reproduced only by apparatus compatible with reproduction of HDVR format. Video recorded from built-in tuner can be recorded as it is. This disk is compatible with recording of digital broadcast program which can be recorded only once. (Video recorded in VR mode can be recorded.) | HD DVD: HD (o) AACS DVD (o) AACS | HD DVD HD-DL (o) AACS DVD-DL (o) AACS |
| | Absence | HDVR format (digital broadcast cannot be recorded) | Digital broadcast program which can be recorded only once cannot be recorded in this disk. This format can realize accurate reproduction of contents edited on HDD. Free title of TS can be recorded. | HD DVD HD (o) DVD (o) | HD DVD HD-DL (o) DVD-DL (o) |
| HD Video | Presence (AACS) | HD-Video format (digital broadcast can be recorded) | This disk can be reproduced by HD DVD player and the like. (Finalization processing is required.) Digital broadcast can be recorded. Data broadcast cannot be recorded. | HD DVD: HD (o) AACS DVD (o) AACS | HD DVD HD-DL (o) AACS DVD-DL (o) AACS |
| | Absence | HD-Video format (digital broadcast cannot be recorded) | This disk can be reproduced by HD DVD player and the like. (Finalization processing is required.) Digital broadcast cannot be recorded. | HD DVD HD (o) DVD (o) | HD DVD HD-DL (o) DVD-DL (o) |
| Video | Absence | Video format (digital broadcast cannot be recorded) | This disk can be reproduced by DVD player and the like. (Finalization processing is required.) Regarding bilingual broadcast, only one language sound can be recorded. Digital broadcast cannot be recorded. | DVD-DL (o) | DVD (o) |

FIG. 3

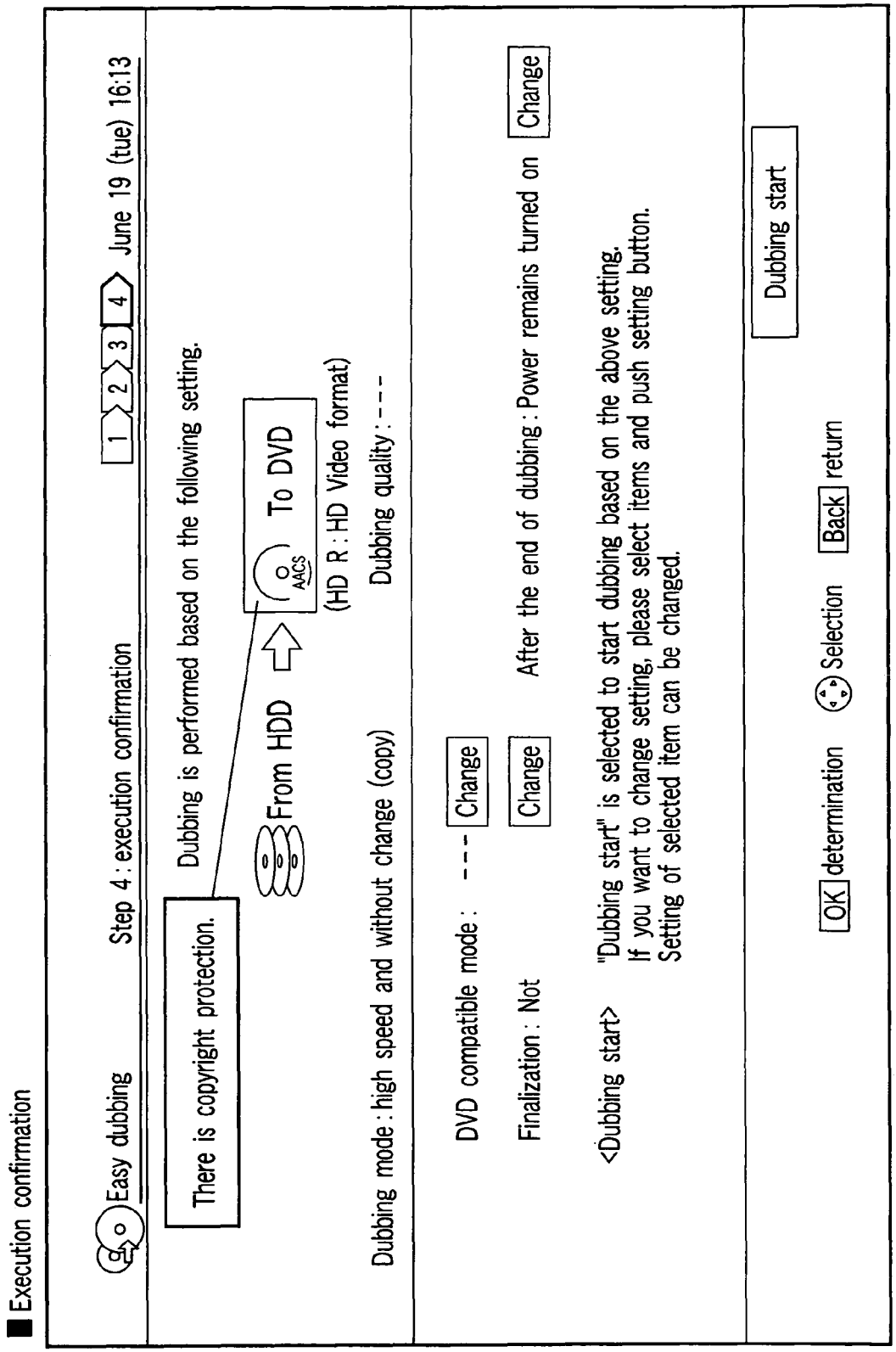
F I G. 23

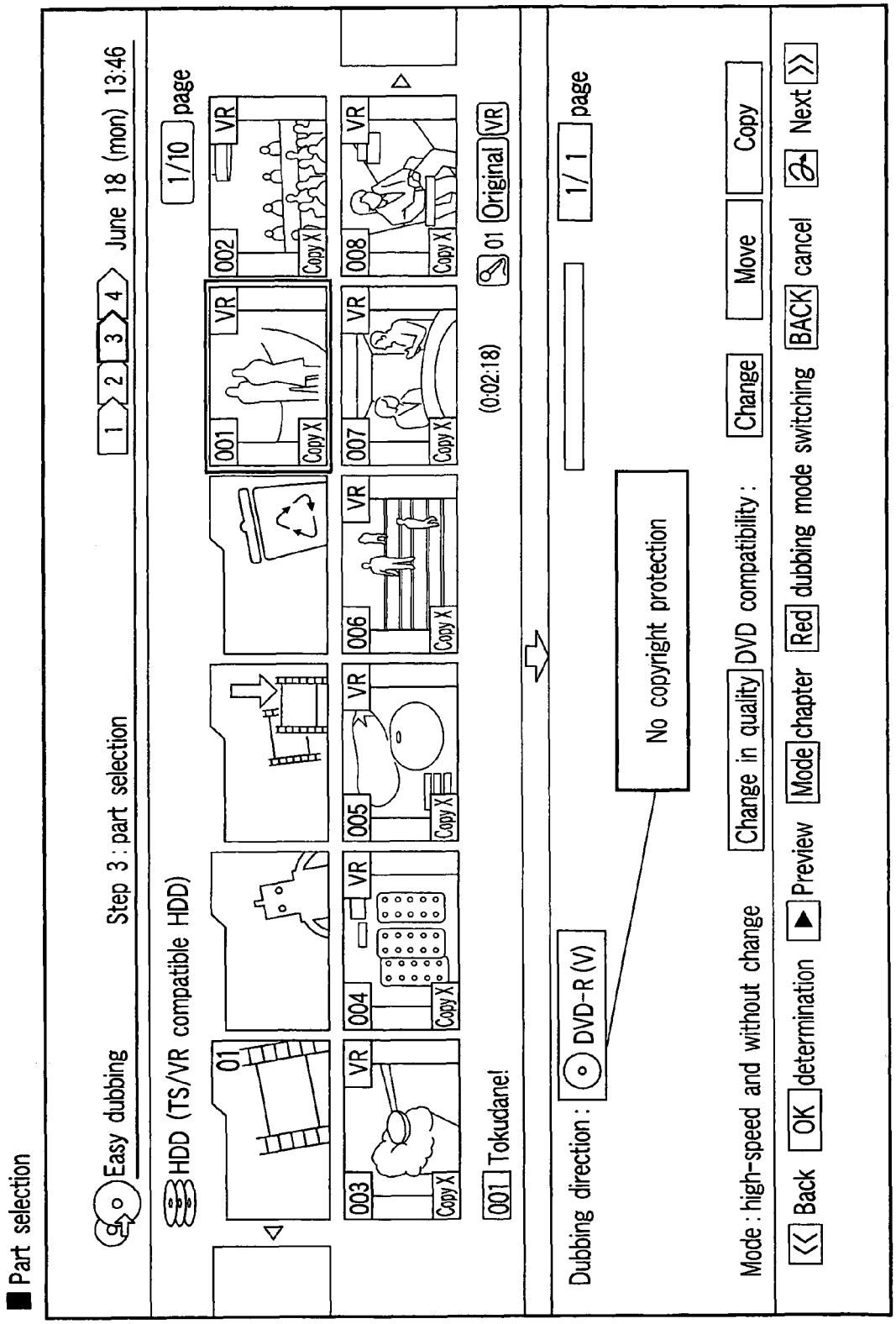
F I G. 28

# OPTICAL DISK DEVICE AND METHOD FOR PROCESSING OPTICAL DISK

CROSS-REFERENCE TO RELATED APPLICATIONS

This application is based upon and claims the benefit of priority from Japanese Patent Application No. 2007-218767, filed Aug. 24, 2007, the entire contents of which are incorporated herein by reference.

BACKGROUND

1. Field

One embodiment of the present invention relates to an optical disk device handling copyright protection information, and particularly to an optical disk device which handles the copyright protection information of an unformatted blank medium, and a method for processing an optical disk.

2. Description of the Related Art

Recently, the digital video technology has been highly developed and widely used, and therefore, the protection of copyright is required. Also in an optical disk device, for example when a digital broadcast signal from a digital tuner or the like is recorded in an optical disk, the countermeasure of the copyright protection is required.

Jpn. Pat. Appln. KOKAI Publication No. 2006-50171 discloses a technique for comparing the copyright protection information of video and audio information as a source of copying with the copyright protection information of a recording medium as a destination of copying to thereby determine whether combination of the source and destination of copying permits copying, and to display the determination result with the addition of the copyright protection information of the recording medium.

However, in the above publication, the presence or absence of the copyright protection in a formatted medium such as an optical disk is determined, and the presence or absence of the copyright protection in an unformatted medium such as an optical disk cannot be determined. Therefore, even if a user formats an optical disk free from copyright protection to try to record a digital broadcast in this optical disk, since the digital broadcast cannot be recorded in the optical disk free from copyright protection, the format processing may be wasted.

In order to achieve the above-described object, an optical disk device according to one embodiment of the invention comprises: a disk drive (20) which applies recording processing and reproduction processing to an optical disk; and a control section (13, 14) which detects, as copyright protection information, a medium ID and a medium key block of an unformatted optical disk inserted into the disk drive and displays the presence or absence of copyright protection information in the optical disk on the basis of the detection result.

The optical disk device of the invention is useful for protecting copyright of an unformatted optical disk, and can inform a user in advance whether a copy-once content, such as a digital broadcast, can be recorded in the optical disk, whereby a needless format processing can be eliminated.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 3 is a view showing an example of record format display, description display, and medium identification display in accordance with a selected format and the presence or absence of copyright protection information in the recording device according to one embodiment of the invention;

FIG. 23 is a view showing an example of the execution confirmation screen with the presence of the copyright protection information displayed therein, according to the recording device of one embodiment of the invention;

FIG. 28 is a view showing an example of the part selection screen with the absence of the copyright protection information displayed therein, according to the recording device of one embodiment of the invention.

DETAILED DESCRIPTION

Various embodiments according to the invention will be described hereinafter. In general, according to one embodiment of the invention, there is provided a disk drive (20) which applies recording processing and reproduction processing to an optical disk; and a control section (13, 14) which detects, as copyright protection information, a medium ID and a medium key block of an unformatted optical disk inserted into the disk drive and displays the presence or absence of copyright protection information in the optical disk on the basis of the detection result.

The optical disk device of the invention is useful for protecting copyright of an unformatted optical disk, and can inform a user in advance whether a copy-once content, such as a digital broadcast, can be recorded in the optical disk, whereby a needless format processing can be eliminated.

Hereinafter, an embodiment of the invention will be described in detail with reference to the drawings.

<Optical Disk Device According to One Embodiment of the Invention>

Figure 1:
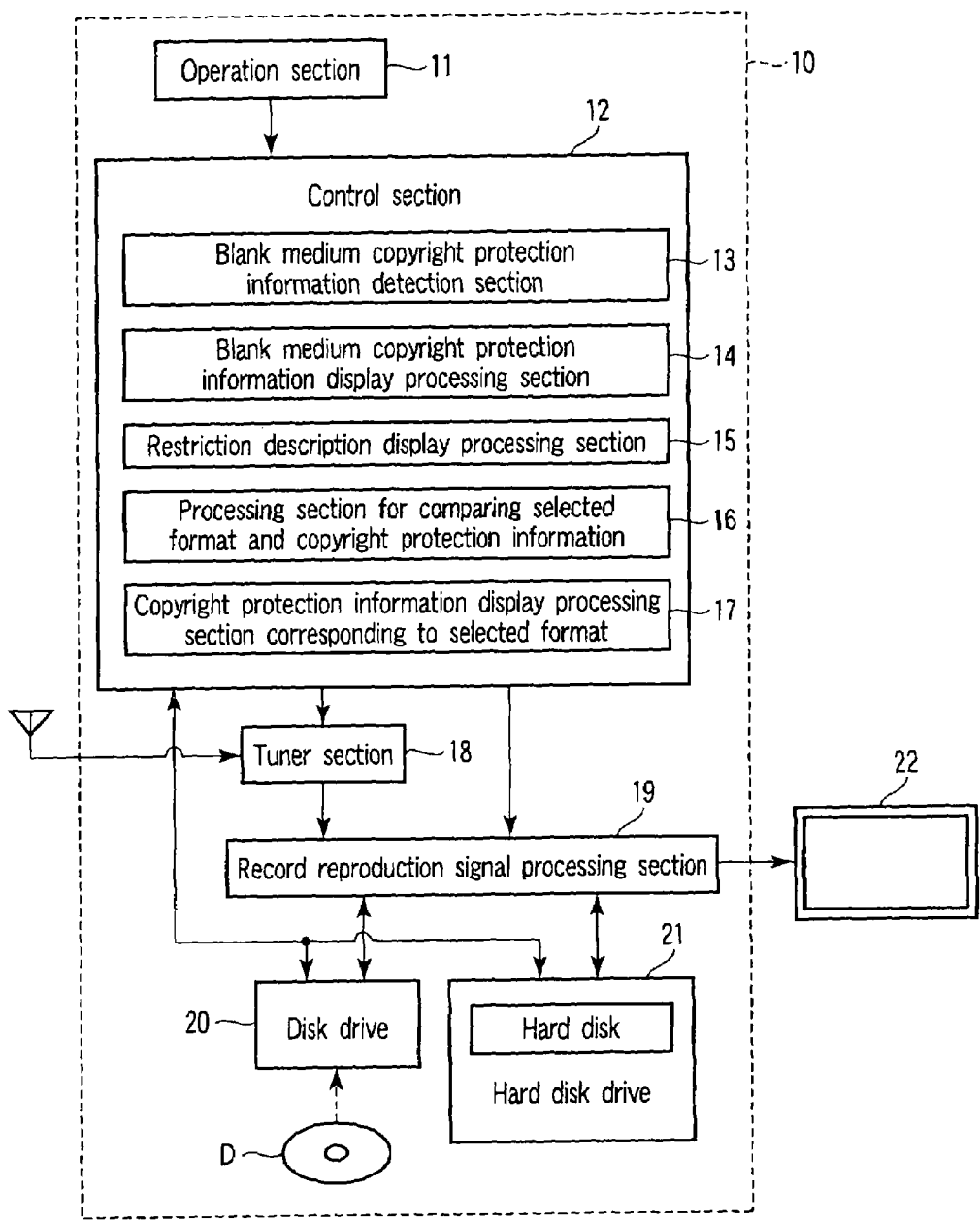
FIG. 1 is a block diagram showing a constitution example of a recording device according to one embodiment of the invention.
Figure 2:
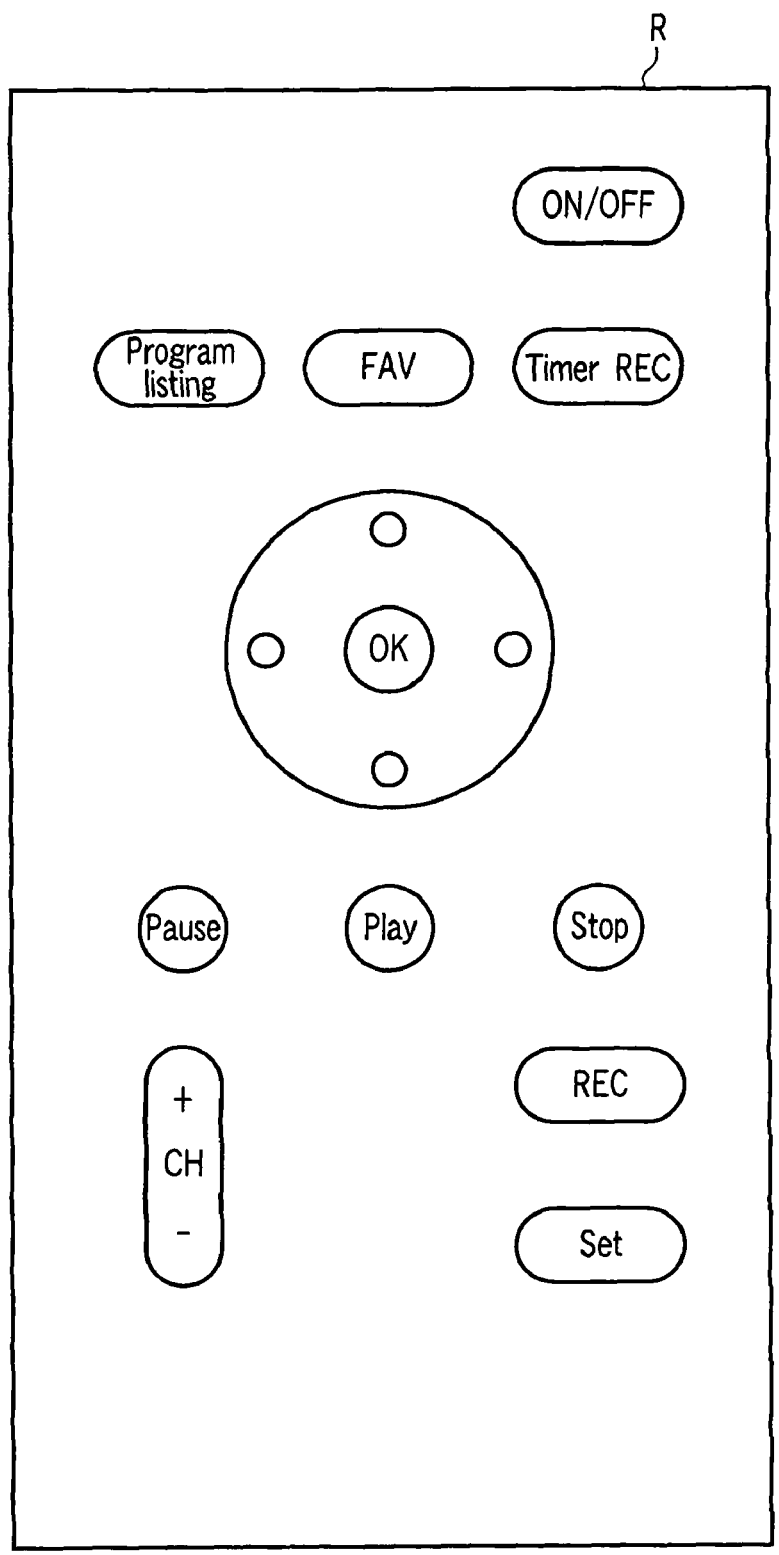
FIG. 2 is a view showing an example of a remote control device of the recording device according to one embodiment of the invention.

A constitution example of an optical disk device as one embodiment of the invention will be described with reference to the drawings. FIG. 1 is a block diagram showing a constitution example of a recording device according to one embodiment of the invention. FIG. 2 is a view showing an example of a remote control device of the recording device according to one embodiment of the invention.

In FIG. 1, an optical disk device 10 as one embodiment of the invention has an operation section 11, a control section 12, and a tuner section 18. The operation section 11 outputs an operation signal in response to the user's operation of a remote controller R shown in FIG. 2 or the user's operation of an operation switch provided in the main body. The control section 12 controls the entire device in response to the operation signal from the operation section 11. The tuner section 18 receives digital terrestrial broadcasting, analog terrestrial broadcasting, digital satellite broadcasting, and analog satellite broadcasting from a broadcast signal supplied from an antenna to output a video/audio signal. The optical disk device 10 further has a disk drive 20, a hard disk drive 21, and a record reproduction signal processing section 19. In the disk drive 20, a laser beam is applied to a recording medium such as an optical disk D to perform recording processing and reproduction processing of information. In the hard disk drive 21, recording processing and reproduction processing of contents are performed. The record reproduction signal processing section 19 receives the video/audio signal from the tuner section 18 to transmit and receive the video/audio signal between the disk drive 20 and the hard disk drive 21. The optical disk device 10 supplies the video and audio signals to a display device 22 which is provided outside and displays a video of a reproduction signal and the broadcast signal on a screen.

The control section 12 has a blank medium copyright protection information detection section 13, a blank medium copyright protection information display processing section 14, a restriction display processing section 15, a processing section 16 for comparing a selected format and copyright protection information, and a copyright protection information display processing section 17 corresponding to the selected format.

The optical disk device 10 records the video/audio signal given from the built-in tuner section 18 and an external input terminal in the optical disk of the disk drive 20 or the hard disk of the hard disk drive 21. Further, in response to the user's operation, the optical disk device 10 reproduces the contents recorded in the optical disk D or the hard disk of the hard disk drive 21 and outputs the video/audio signal outside.

However, for example when the broadcast signal received by the tuner section 18 is the digital terrestrial broadcast signal including a limitation of recording a copy-once content, the optical disk D as the destination of recording is required to have a copyright protection function. When the optical disk D is formatted, it can be easily known whether the copyright protection function including CPRM and AACS is provided. However, when the optical disk D is not formatted, since the presence or absence of the copyright protection information is not displayed, the user cannot know that recording cannot be performed in the optical disk D before the format processing, and therefore, the user may perform a needless format processing.

<Processing of Displaying the Presence or Absence of Copyright Protection Information and the Allowability of Copying of Contents>

Figure 4:
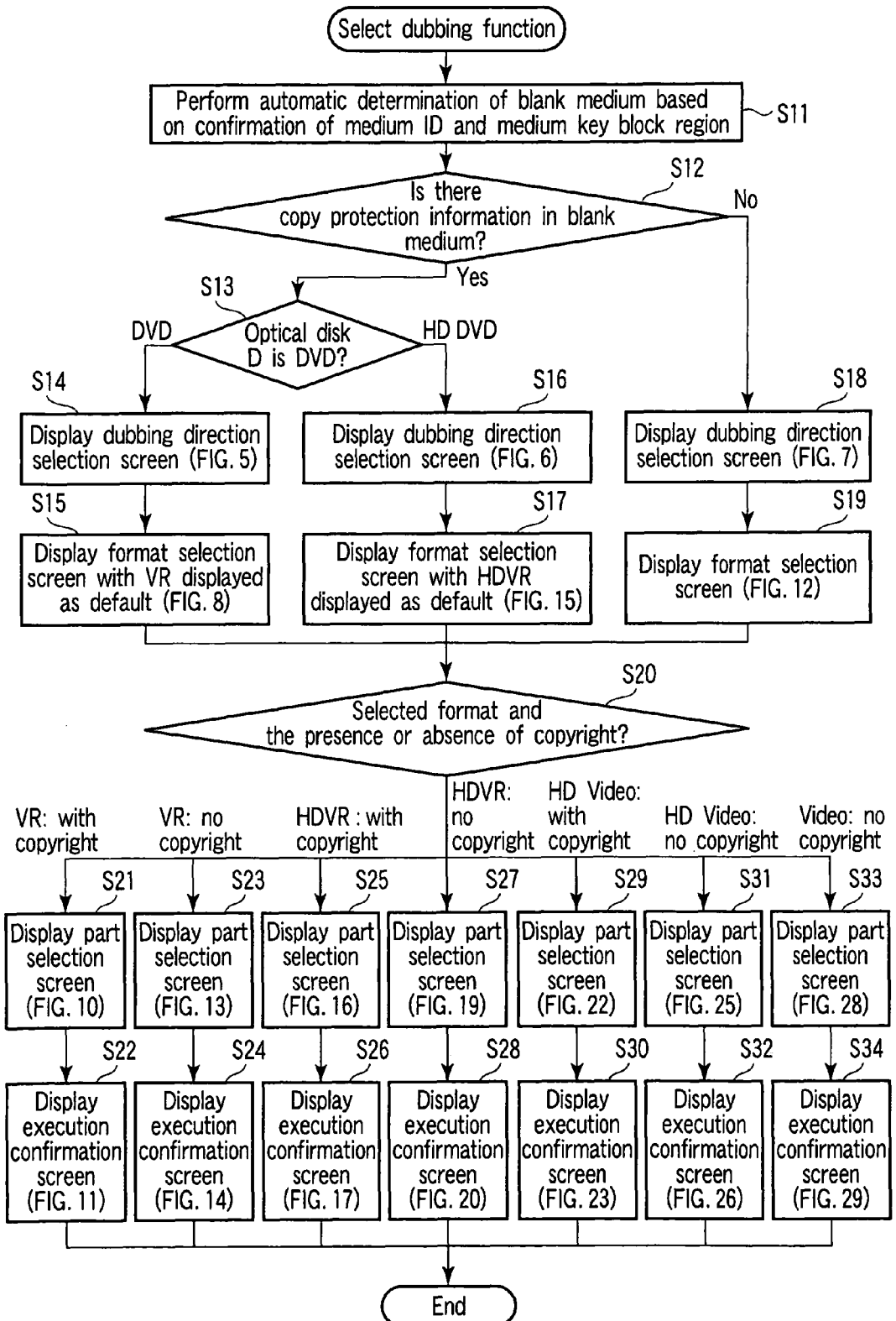
FIG. 4 is a flow chart showing an example of a copyright protection information display processing in the recording device according to one embodiment of the invention.
Figure 5:
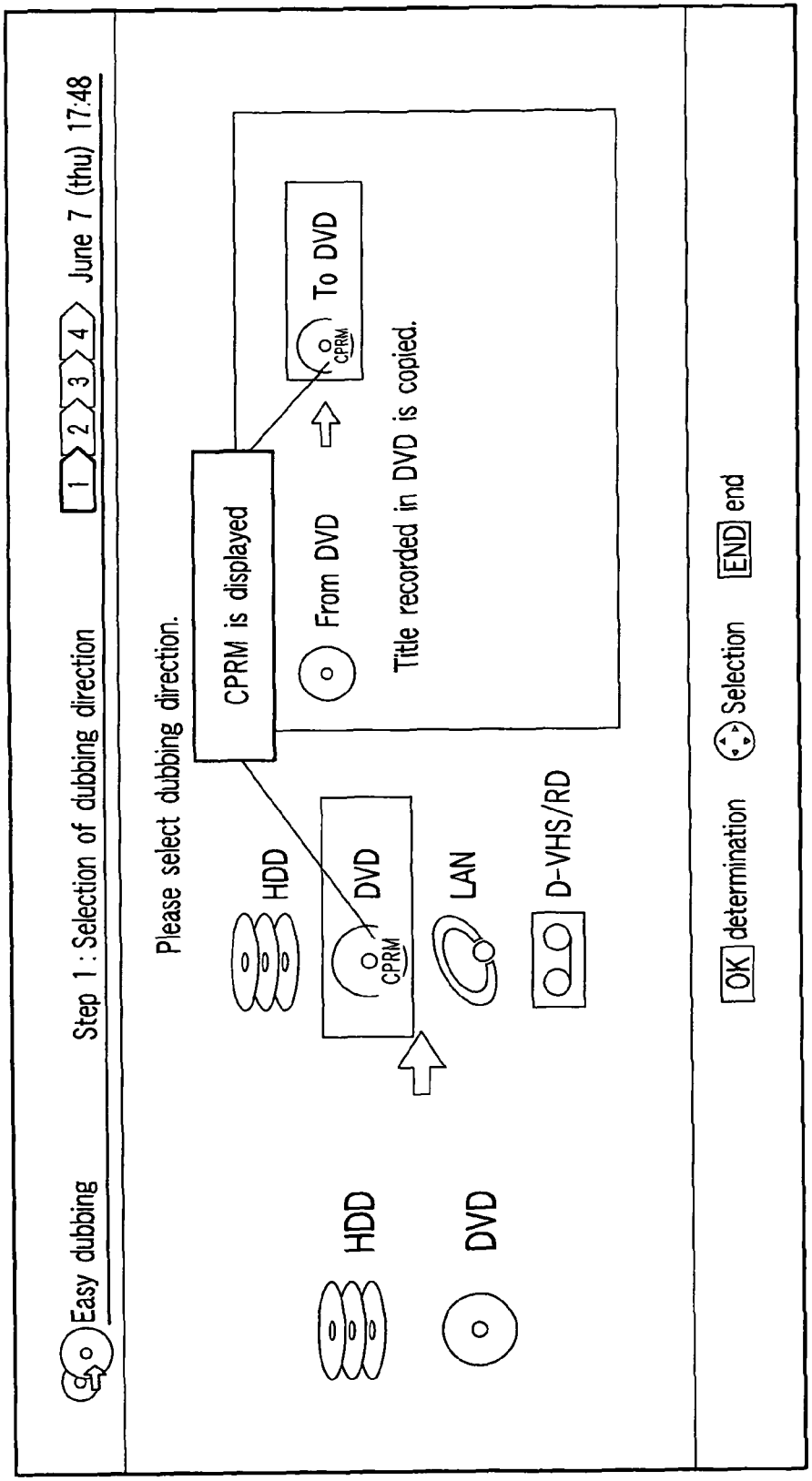
FIG. 5 is a view showing an example of a DVD dubbing direction selection screen with the presence of the copyright protection information displayed therein, according to the recording device of one embodiment of the invention.
Figure 6:
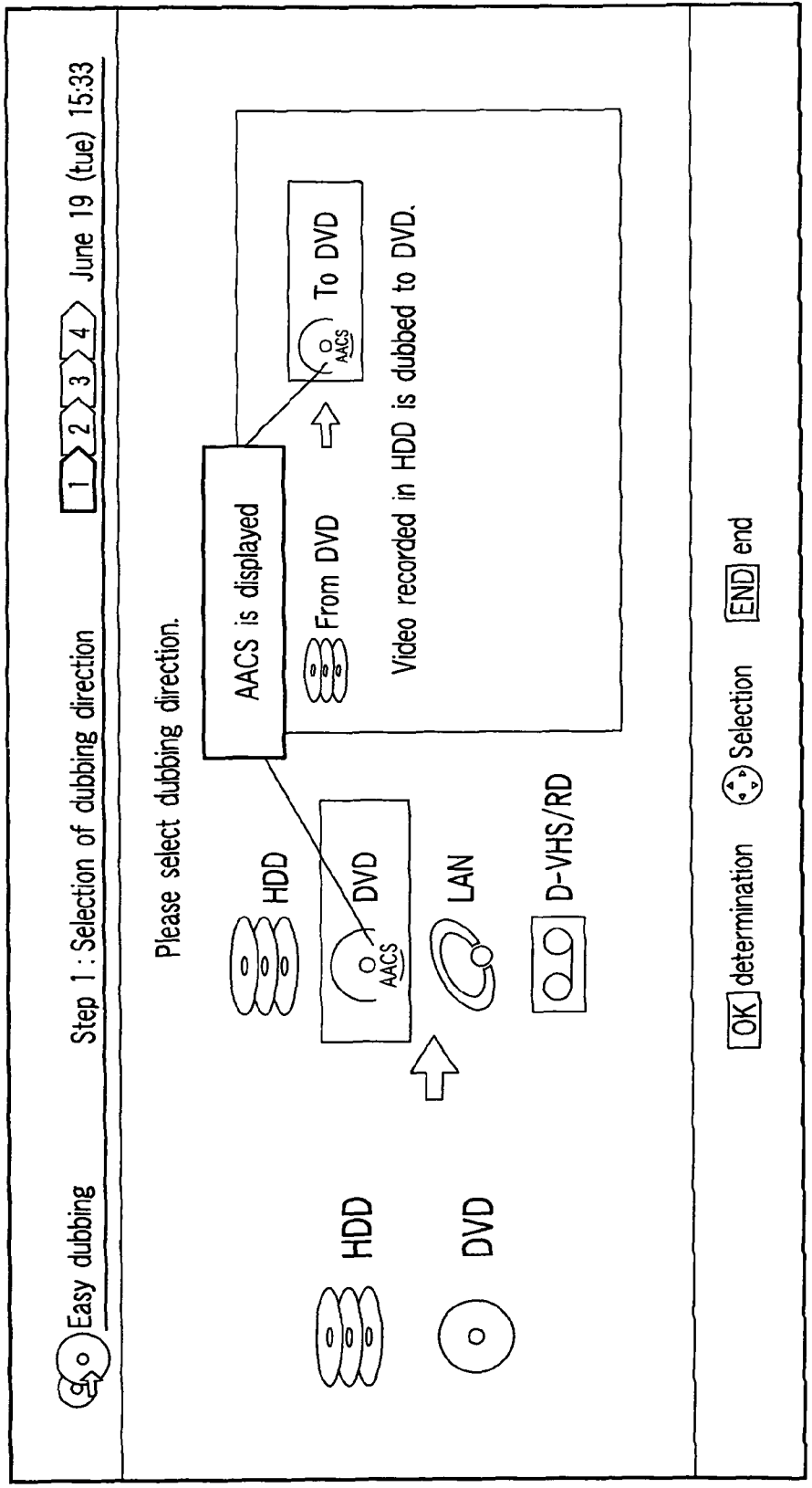
FIG. 6 is a view showing an example of an HD DVD dubbing direction selection screen with the presence of the copyright protection information displayed therein, according to the recording device of one embodiment of the invention.
Figure 7:
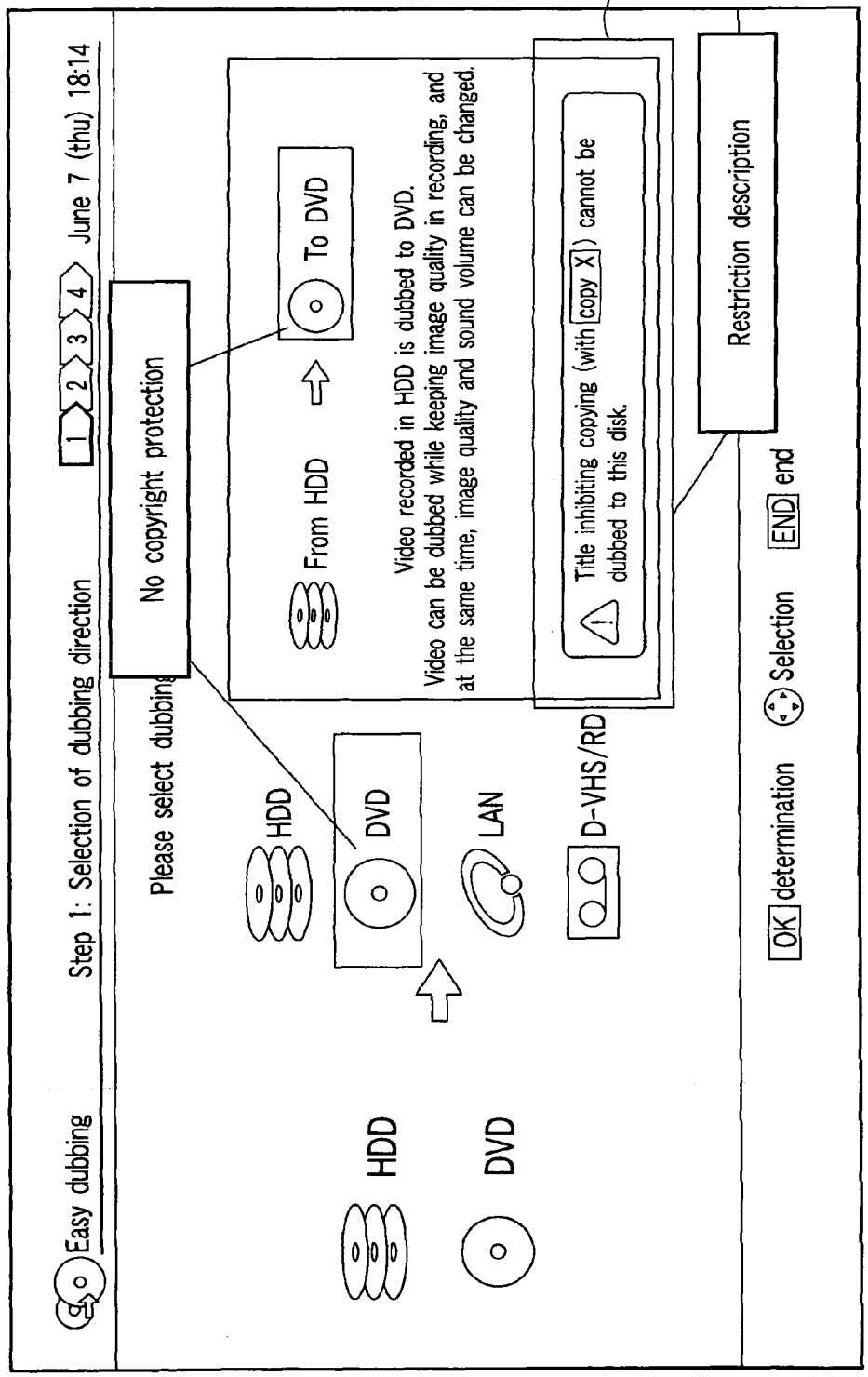
FIG. 7 is a view showing an example of a dubbing direction selection screen with the absence of the copyright protection information displayed therein, according to the recording device of one embodiment of the invention.
Figure 8:
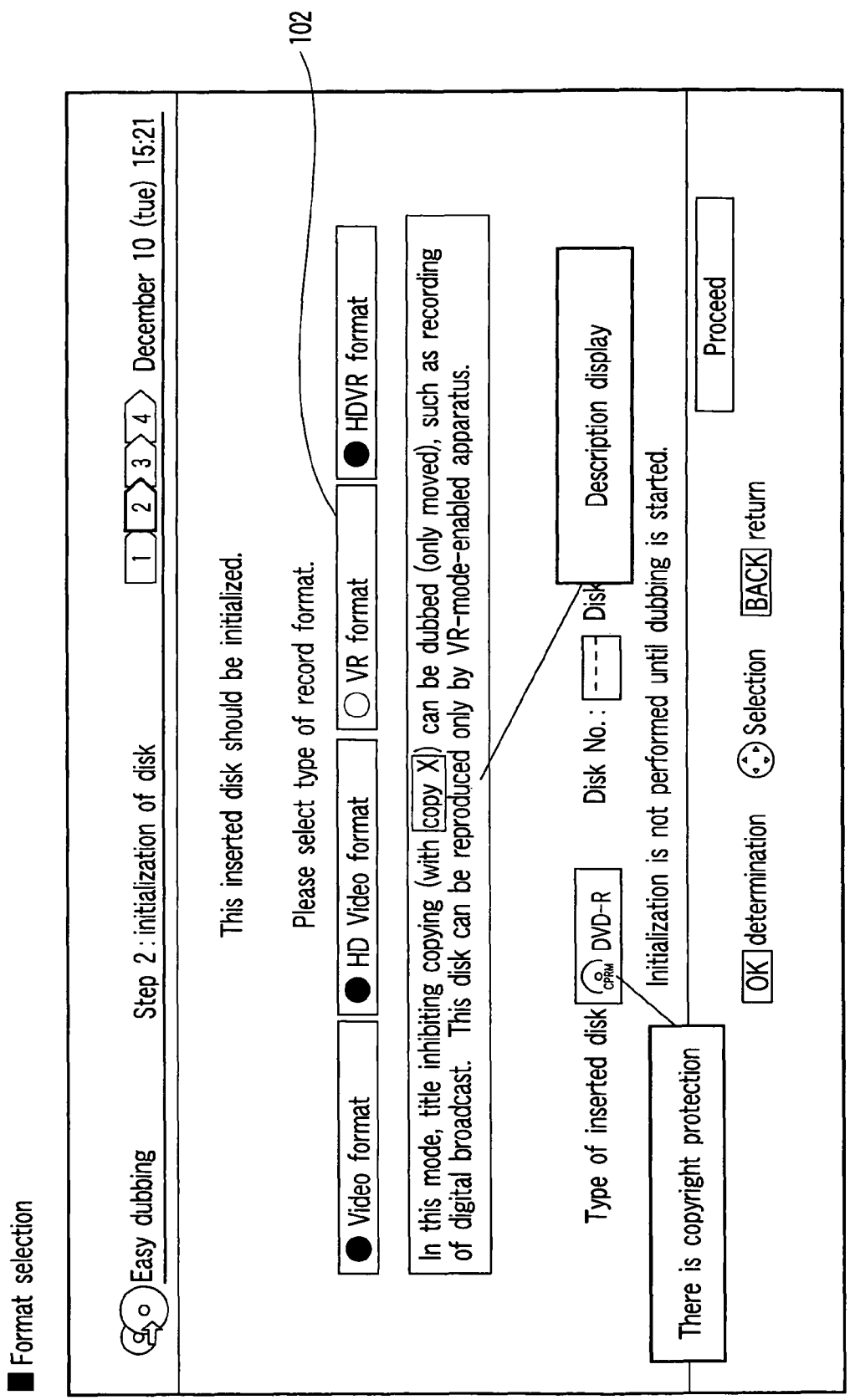
FIG. 8 is a view showing an example of a format selection screen with the presence of the copyright protection information displayed therein, according to the recording device of one embodiment of the invention.
Figure 9:
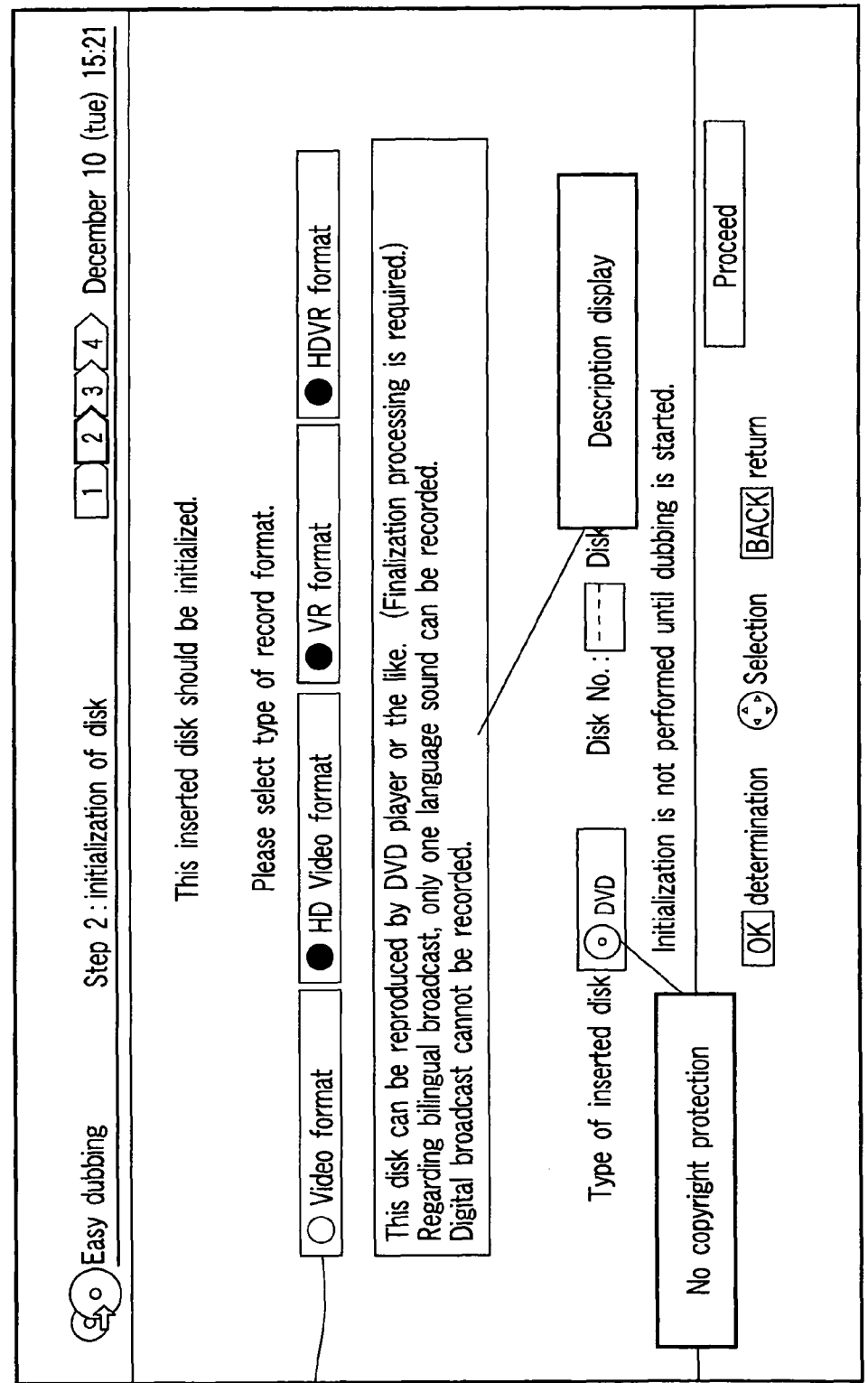
FIG. 9 is a view showing another example of a format selection screen with the presence of the copyright protection information displayed therein, according to the recording device of one embodiment of the invention.
Figure 12:
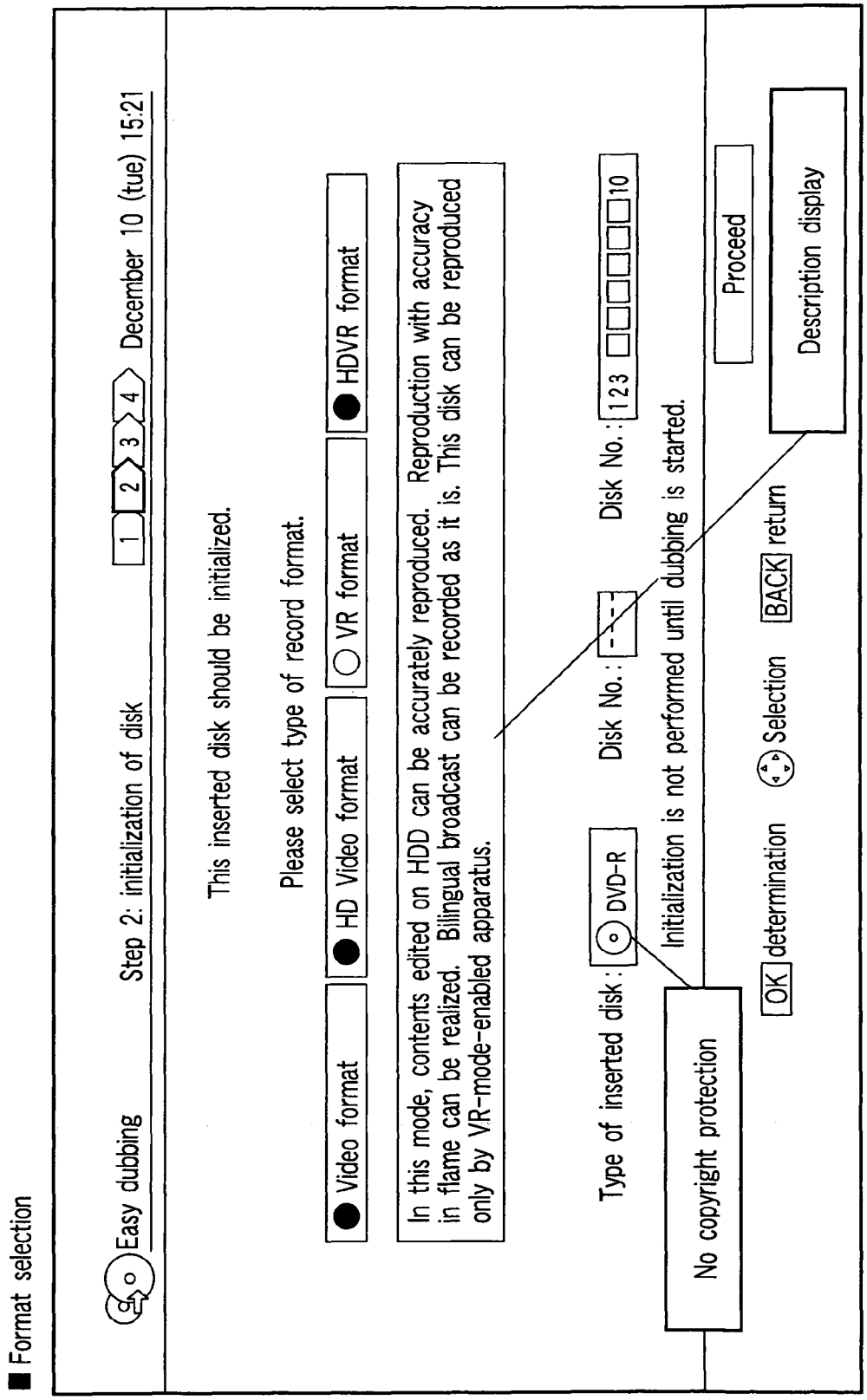
FIG. 12 is a view showing an example of the format selection screen with the absence of the copyright protection information displayed therein, according to the recording device of one embodiment of the invention.
Figure 15:
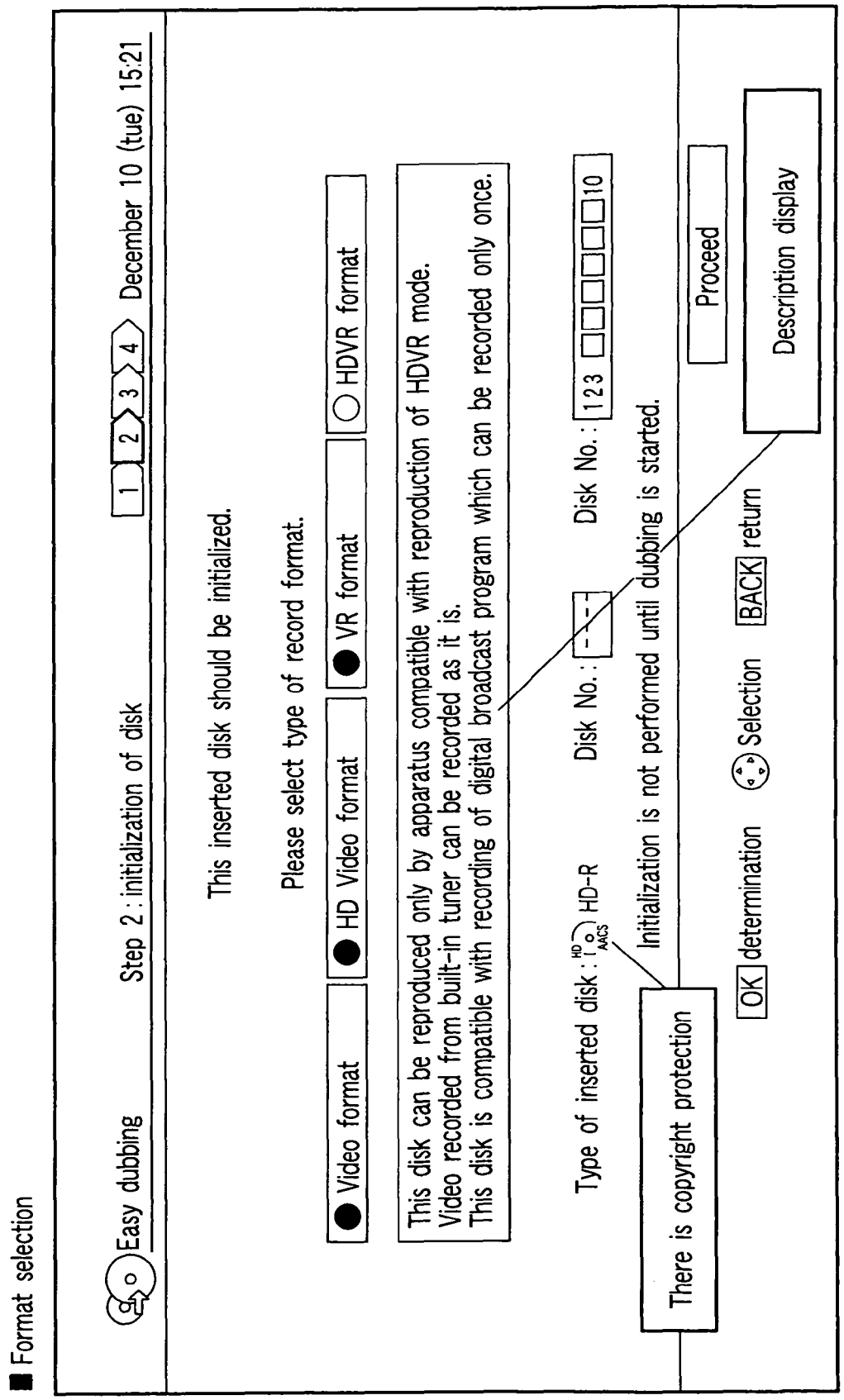
FIG. 15 is a view showing an example of the format selection screen with the presence of the copyright protection information displayed therein, according to the recording device of one embodiment of the invention.

Next, a processing of determining the presence or absence of the copyright protection information, which is necessary for the optical disk device 10 for example in the recording processing of the digital broadcast and the like, will be hereinafter described in detail using the drawings. FIG. 3 is a view of an example of a selected format of the recording device according to one embodiment of the invention, record format display, description display, and medium identification display in accordance with the presence or absence of the copyright protection information. FIG. 4 is a flow chart showing an example of a copyright protection information display processing in the recording device according to one embodiment of the invention. FIG. 5 shows an example of a DVD dubbing direction selection screen with the presence of the copyright protection information displayed therein, according to the recording device of one embodiment of the invention. FIG. 6 shows an example of an HD DVD dubbing direction selection screen with the presence of the copyright protection information displayed therein, according to the recording device of one embodiment of the invention. FIG. 7 shows an example of a dubbing direction selection screen with the absence of the copyright protection information displayed therein, according to the recording device of one embodiment of the invention. FIGS. 8 and 9 show an example of a format selection screen with the presence of the copyright protection information displayed therein, according to the recording device of one embodiment of the invention. FIG. 12 shows an example of the format selection screen with the absence of the copyright protection information displayed therein, according to the recording device of one embodiment of the invention. FIG. 15 is a view showing an example of the format selection screen with the presence of the copyright protection information displayed therein, according to the recording device of one embodiment of the invention.

In one embodiment of the invention, for example when a content recorded in a hard disk and requiring copyright protection is recorded in the optical disk D, the presence of the copyright protection function in the optical disk, which is an unformatted blank disk, is displayed, and in addition, it is displayed whether the content can be recorded in the optical disk D. Thereby, it is previously explained to the user whether the contents can be recorded in the unformatted optical disk D. Namely, in the optical disk device 10 with a built-in hard disk, when a digital broadcast content with a copy limit stored in the hard disk drive 21 is recorded in the optical disk D, the presence or absence of the copyright protection information in the unformatted optical disk D is displayed in a display device.

Incidentally, each step of the flow chart of FIG. 4 can be replaced with a circuit block, and thus all steps of each flow chart can be redefined as processing blocks.

Processing of Displaying the Presence or Absence of Copyright Protection Information in Formatted Disk and the Allowability of Copying of Contents First, a processing of displaying the presence or absence of the copyright protection information in a formatted disk and the allowability of copying of contents will be described.

With regard to the formatted disk, the control section 12 reads out management information of the optical disk D to determine that the copyright protection information is included in a medium certified by CPRM or AACS. In other words, the control section 12 confirms the presence of "specific Identification Data (ID) of a recording medium" and "a Media Key Block (MKB) region" in the management region of the optical disk D to determine whether "a key generated by combining device keys of a recording device" is recorded, whereby, when the key is recorded, the control section 12 determines that there is the copyright protection information in the optical disk D. This determination result is displayed on a dubbing operation screen of the formatted disk.

Processing of Displaying the Presence or Absence of Copyright Protection Information in Unformatted Disk (Blank Disk) and the Allowability of Copying of Contents When the control section 12, as shown in FIG. 3, determines that the optical disk D is an unformatted disk (blank disk), a record format display, a description display, and a medium identification display are displayed on a dubbing operation screen, in accordance with the selected format and the presence or absence of the copyright protection information. The format to be selected is any one of a VR format, an HDVR format, an HD Video format, and a Video format. The copyright protection information is either present or absent. In this embodiment, there are seven combinations of the record format display, the description display, and the medium identification display.

The procedure of this processing will be hereinafter described in detail with reference to the flow chart of FIG. 4.

When the optical disk D is inserted into the disk drive 20, and the blank medium copyright protection information detection section 13 (FIG. 1) of the control section 12 receives the operation signal, which indicates that the dubbing operation is performed, from the operation section 11, the blank medium copyright protection information detection section 13 determines whether a key, generated by combining the specific ID of a recording medium, the MKB, and the device keys provided in the recording device, is provided in the management region of the optical disk D (step S11). When there is the key in the management region of the optical disk D, the control section 12 determines that the optical disk D is the formatted disk having the copyright protection information to reflect the determination result on the dubbing operation screen.

Meanwhile, when the optical disk D is the unformatted disk (blank disk), and there is the copy protection information (step S12, "Yes"), the control section 12 determines the type of the optical disk D (step S13), and when the optical disk D is DVD, the processing proceeds to step 14. In step 14, the blank medium copyright protection information display processing section 14 displays a dubbing direction selection screen with the copyright protection information such as "CPRM" displayed therein (shown in FIG. 5). In the dubbing direction selection screen of FIG. 5, the dubbing direction (the source and destination of dubbing) is selected, and at the same time, the presence of the copyright protection information in the unformatted optical disk D is displayed.

When the dubbing direction is selected, the blank medium copyright protection information display processing section 14 displays a format selection screen with the copyright protection information such as "CPRM" displayed therein (shown in FIG. 8) (step S15). In the format selection screen of FIG. 8, the copyright protection information "CPRM" and a VR format 102 as default are displayed in accordance with the type of the optical disk D.

As shown in FIG. 9, if a user selects not the default format, but a "Video format" 103 for example, the absence of the copyright protection information is displayed, and the description, "You can play it with DVD player or the like. (Finalization processing is required.) Regarding bilingual broadcast, only one language sound can be recorded" and the description based on the absence of the copyright protection information, "digital broadcast cannot be recorded" are displayed. According to those descriptions, the user can understand that the format is changed to cause the copyright protection information to be absent, whereby the digital broadcast cannot be recorded in that optical disk D.

Meanwhile, in step S13, when the optical disk D is HD DVD, the processing proceeds to step S16. In step S16, the blank medium copyright protection information display processing section 14 displays a dubbing direction selection screen with the copyright protection information such as "AACS" displayed therein (shown in FIG. 6). In the dubbing direction selection screen of FIG. 6, the dubbing direction (the source and destination of dubbing) is selected, and at the same time, the presence of the copyright protection information in the unformatted optical disk D is displayed.

When the dubbing direction is selected, the blank medium copyright protection information display processing section 14 displays a format selection screen with the copyright protection information such as "AACS" displayed therein (shown in FIG. 15) (step S17). In the format selection screen of FIG. 15, the copyright protection information "AACS" and the HDVR format as default are displayed in accordance with the type of the optical disk D.

Meanwhile, when the blank medium copyright protection information detection section 13 cannot detect the Media ID and the MKB (when the blank medium copyright protection information detection section 13 can detect only one of the Media ID and the MKB or can detect neither) in step S12, the processing proceeds to step S18. In step S18, the blank medium copyright protection information display processing section 14 displays a dubbing direction selection screen without displaying the copyright protection information, such as "AACS" (shown in FIG. 7). In the screen of FIG. 7, the dubbing direction (the source and destination of dubbing) is selected, and at the same time, the absence of the copyright protection information in the unformatted optical disk D is displayed. At the same time, a restriction description is also displayed in the dubbing direction selection of FIG. 7.

When the dubbing direction is selected, the blank medium copyright protection information display processing section 14 displays a format selection screen without displaying the copyright protection information, such as "AACS" (shown in FIG. 12) (step S19). In the format selection screen of FIG. 12, the occurrence of use restrictions is displayed based on the absence of the copyright protection information.

When a format is selected by the user's operation, the control section 12 and the processing section 16 for comparing a selected format and the copyright protection information display each part selection screen shown in steps S21, S23, S25, S27, S29, S31, and S33, in accordance with the selected format. The part to be copied is selected in the part selection screen. The presence or absence of the copyright protection information is displayed also in the part selection screen.

Finally, each execution confirmation screen shown in steps S22, S24, S26, S28, S30, S32, and S34 is displayed. In those execution confirmation screens, whether an instruction for the execution of the final dubbing processing is issued from a user is confirmed. The presence or absence of the copyright protection information is displayed also in the execution confirmation screen.

As described above, in the optical disk device 10 as one embodiment of the invention, it is possible to inform a user in advance whether a copy-once content such as digital broadcast can be recorded in an unformatted optical disk (blank medium). As a result, a needless format processing can be eliminated.

<Dubbing Operation Screen>

Figure 10:
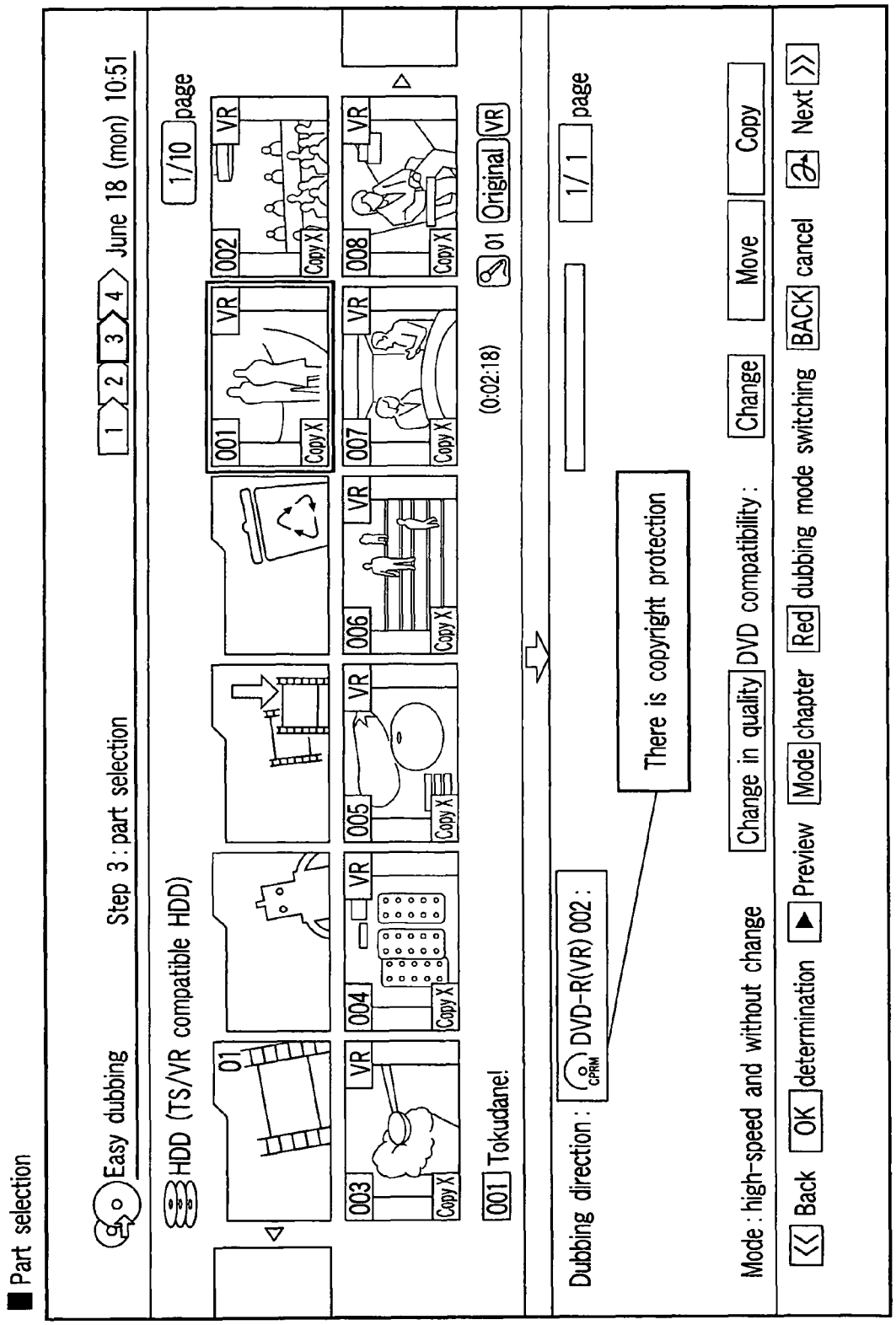
FIG. 10 is a view showing an example of a part selection screen with the presence of the copyright protection information displayed therein, according to the recording device of one embodiment of the invention.
Figure 11:
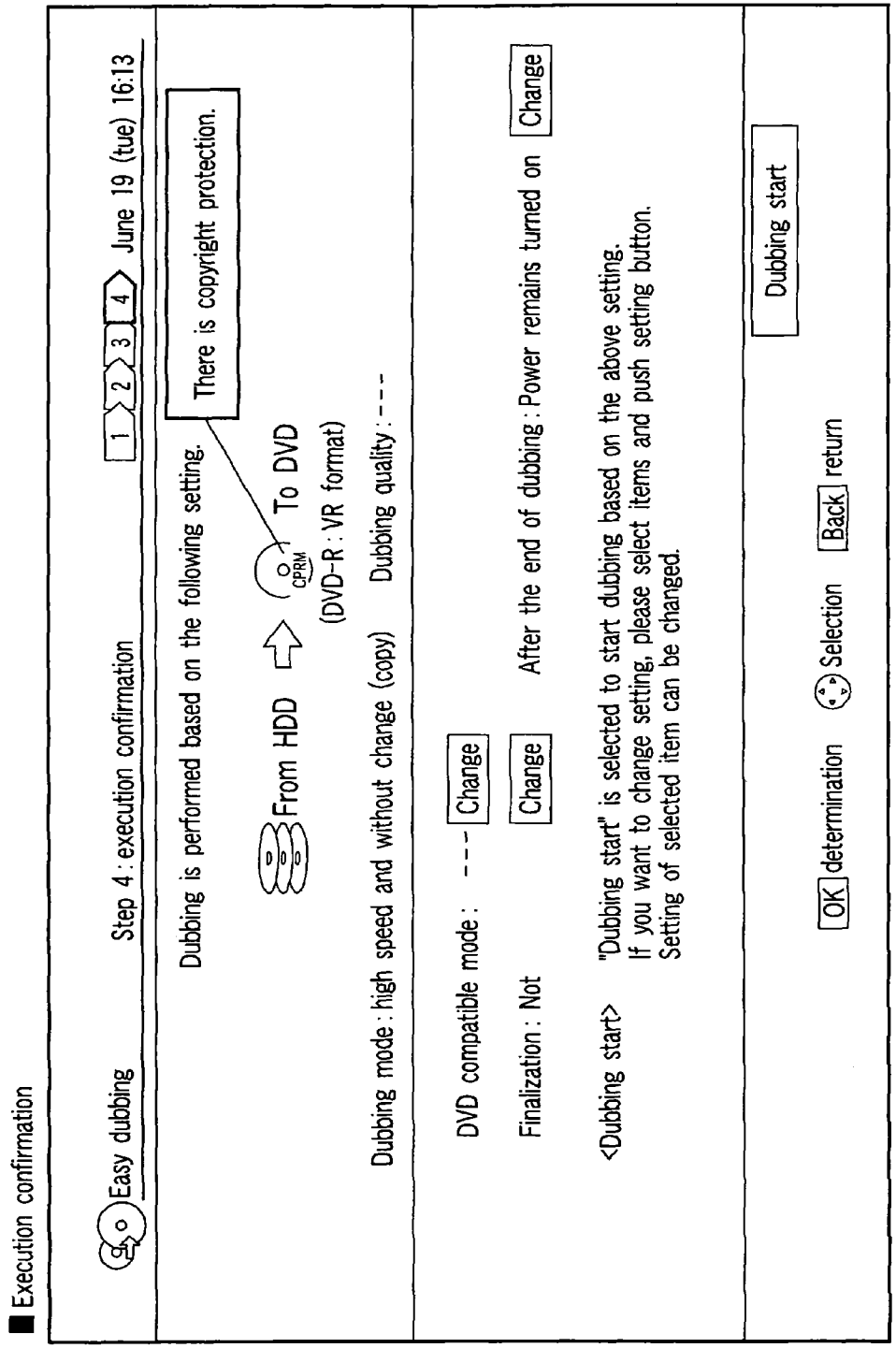
FIG. 11 is a view showing an example of an execution confirmation screen with the presence of the copyright protection information displayed therein, according to the recording device of one embodiment of the invention.
Figure 13:
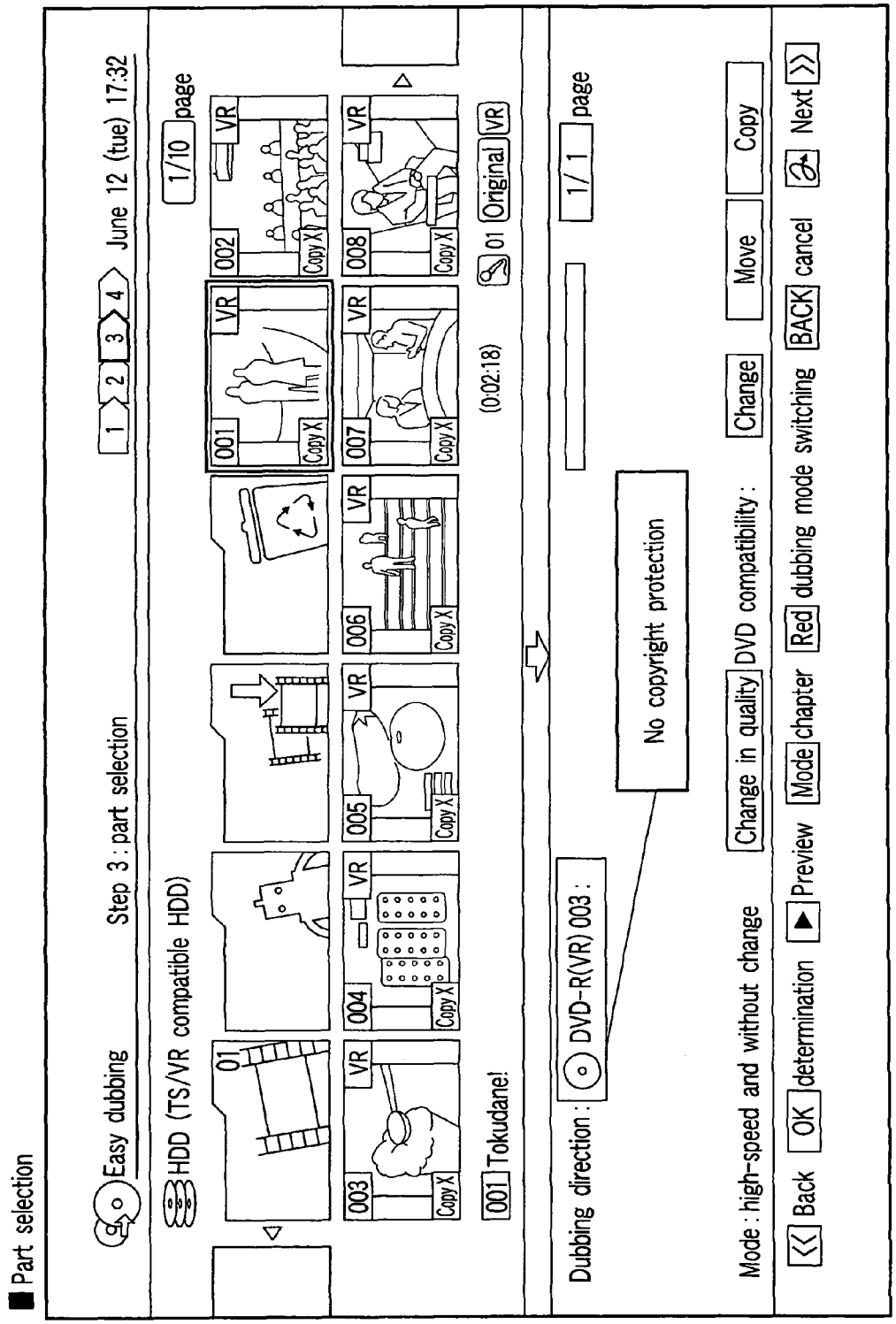
FIG. 13 is a view showing an example of the part selection screen with the absence of the copyright protection information displayed therein, according to the recording device of one embodiment of the invention.
Figure 14:
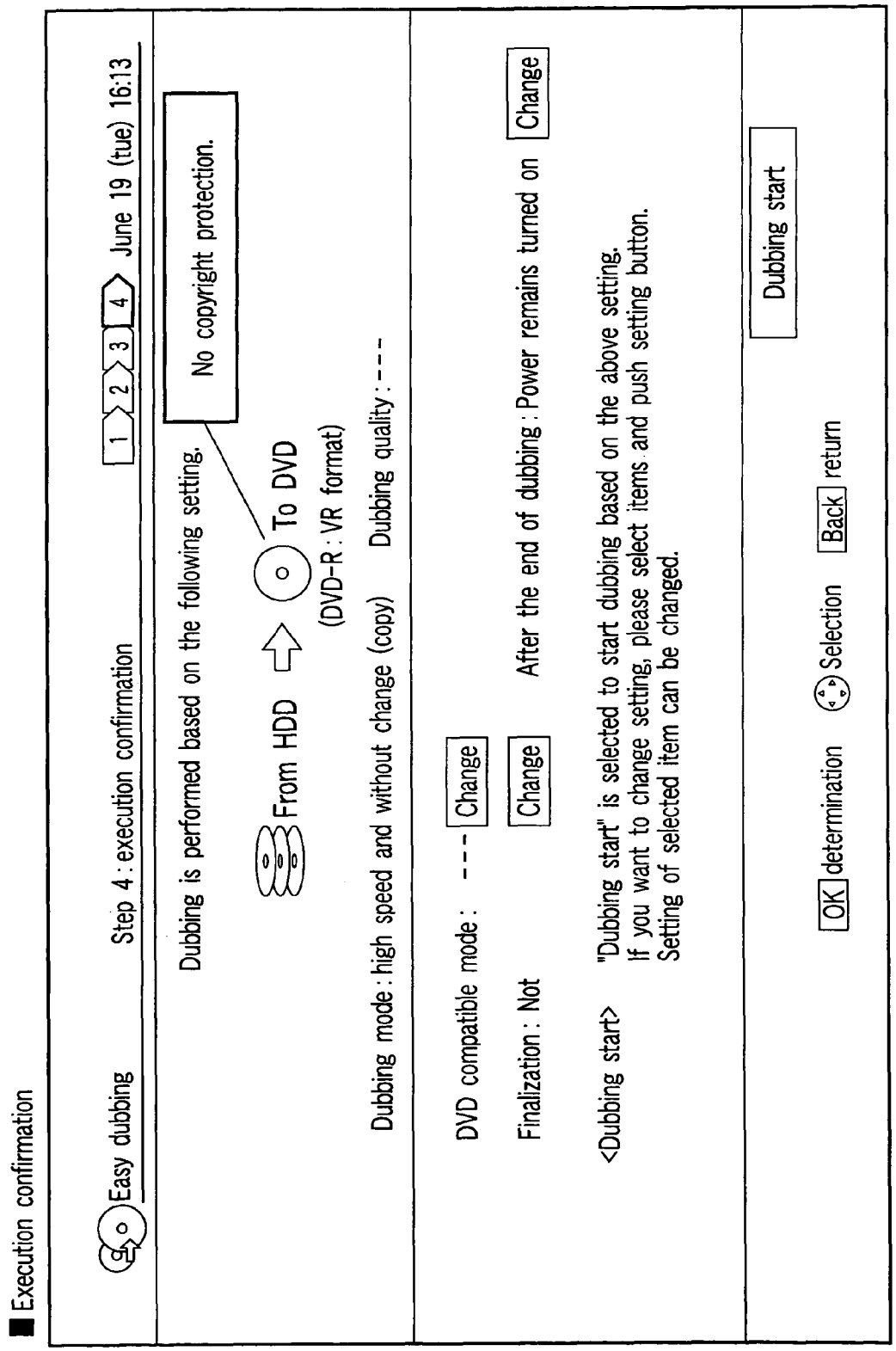
FIG. 14 is a view showing an example of the execution confirmation screen with the absence of the copyright protection information displayed therein, according to the recording device of one embodiment of the invention.
Figure 16:
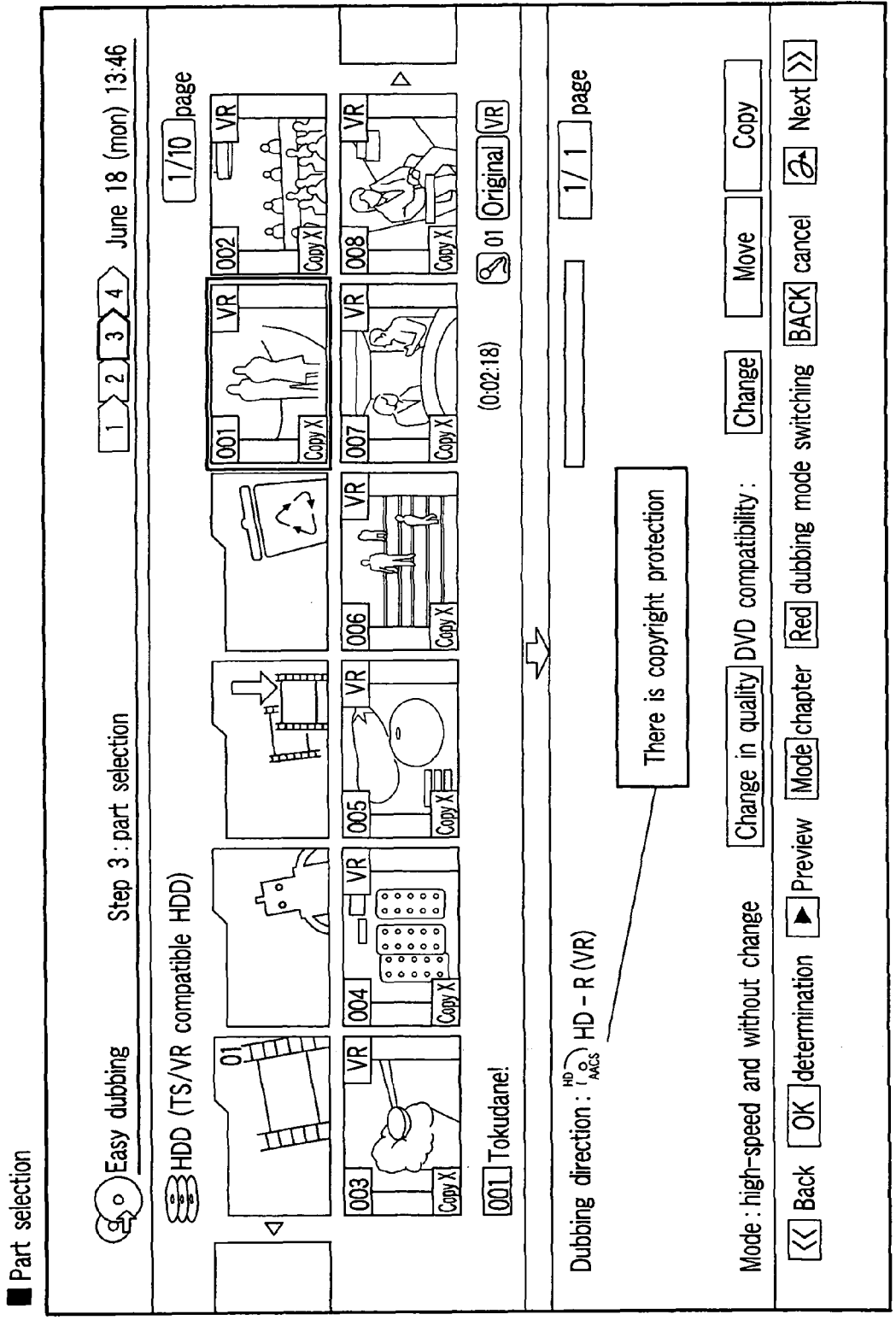
FIG. 16 is a view showing an example of the part selection screen with the presence of the copyright protection information displayed therein, according to the recording device of one embodiment of the invention.
Figure 17:
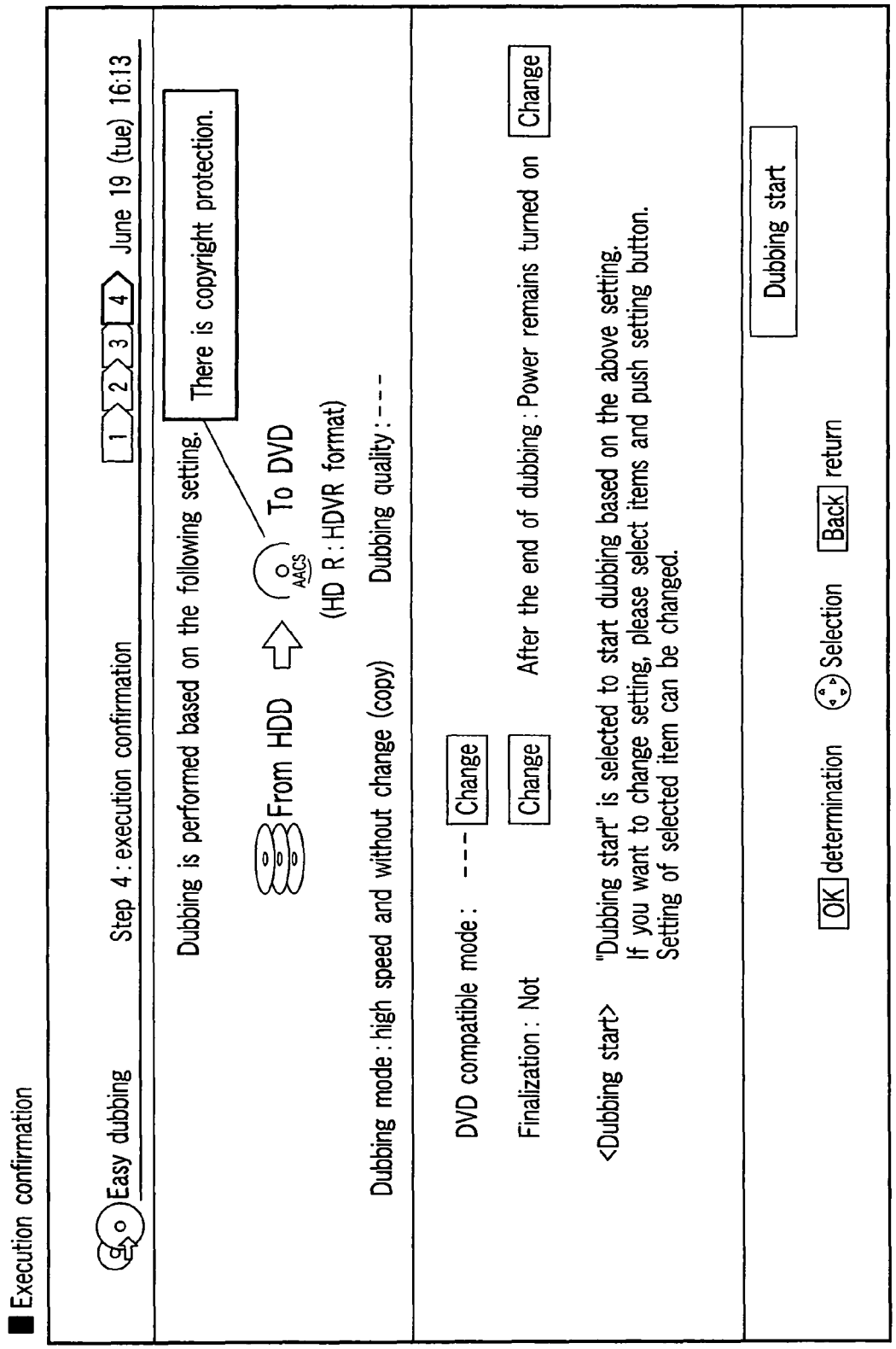
FIG. 17 is a view showing an example of the execution confirmation screen with the presence of the copyright protection information displayed therein, according to the recording device of one embodiment of the invention.
Figure 19:
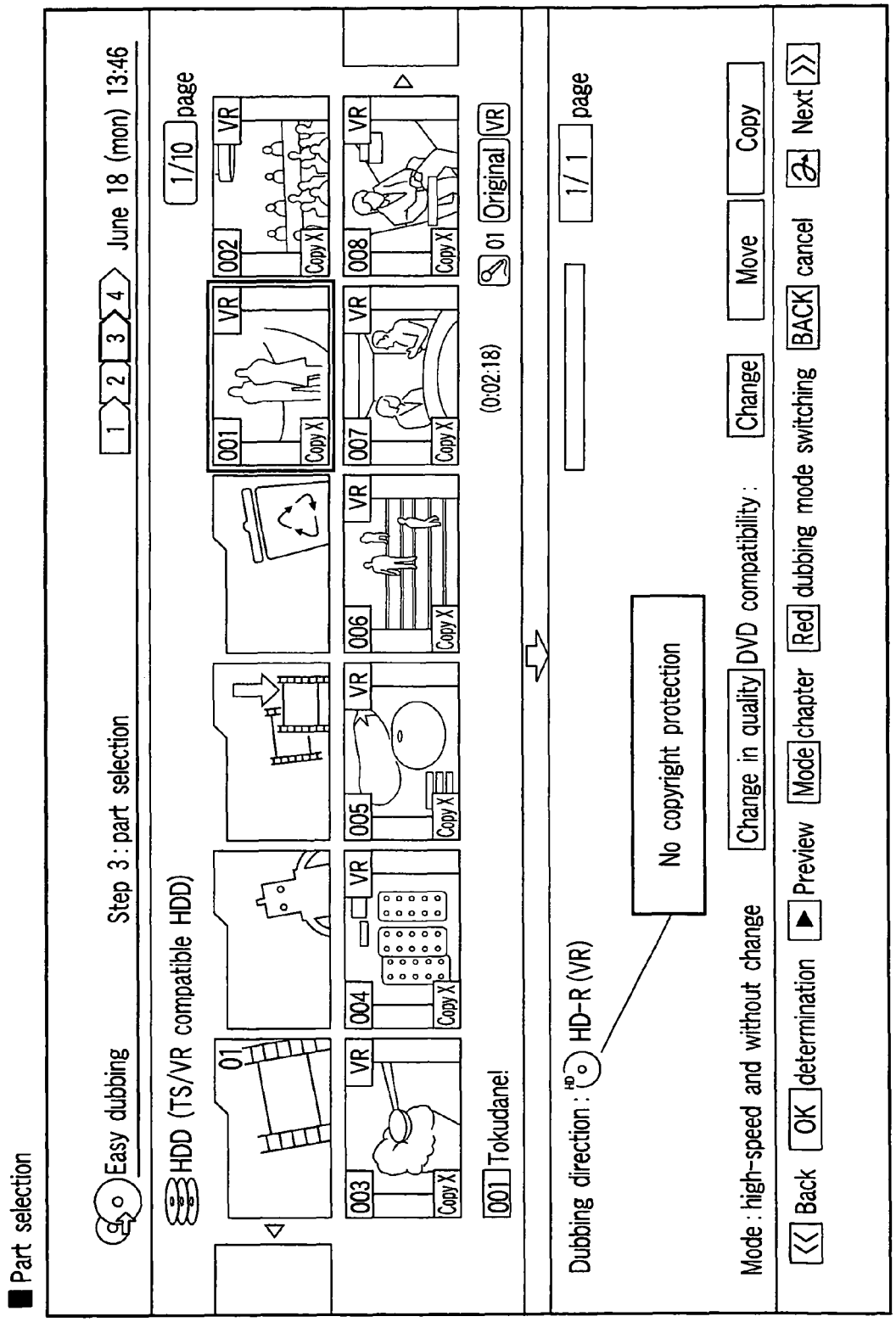
FIG. 19 is a view showing an example of the part selection screen with the absence of the copyright protection information displayed therein, according to the recording device of one embodiment of the invention.
Figure 20:
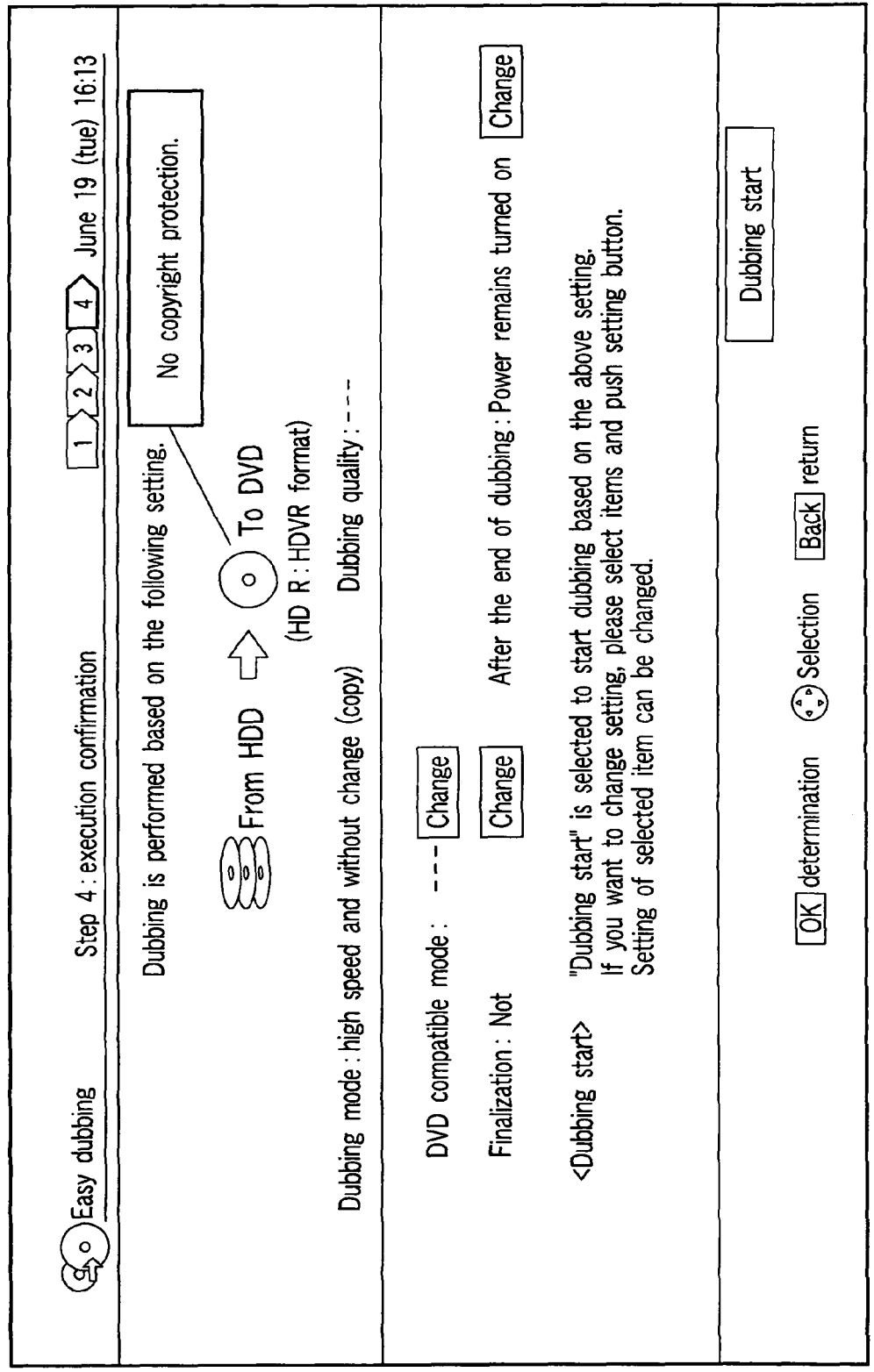
FIG. 20 is a view showing an example of the execution confirmation screen with the absence of the copyright protection information displayed therein, according to the recording device of one embodiment of the invention.
Figure 22:
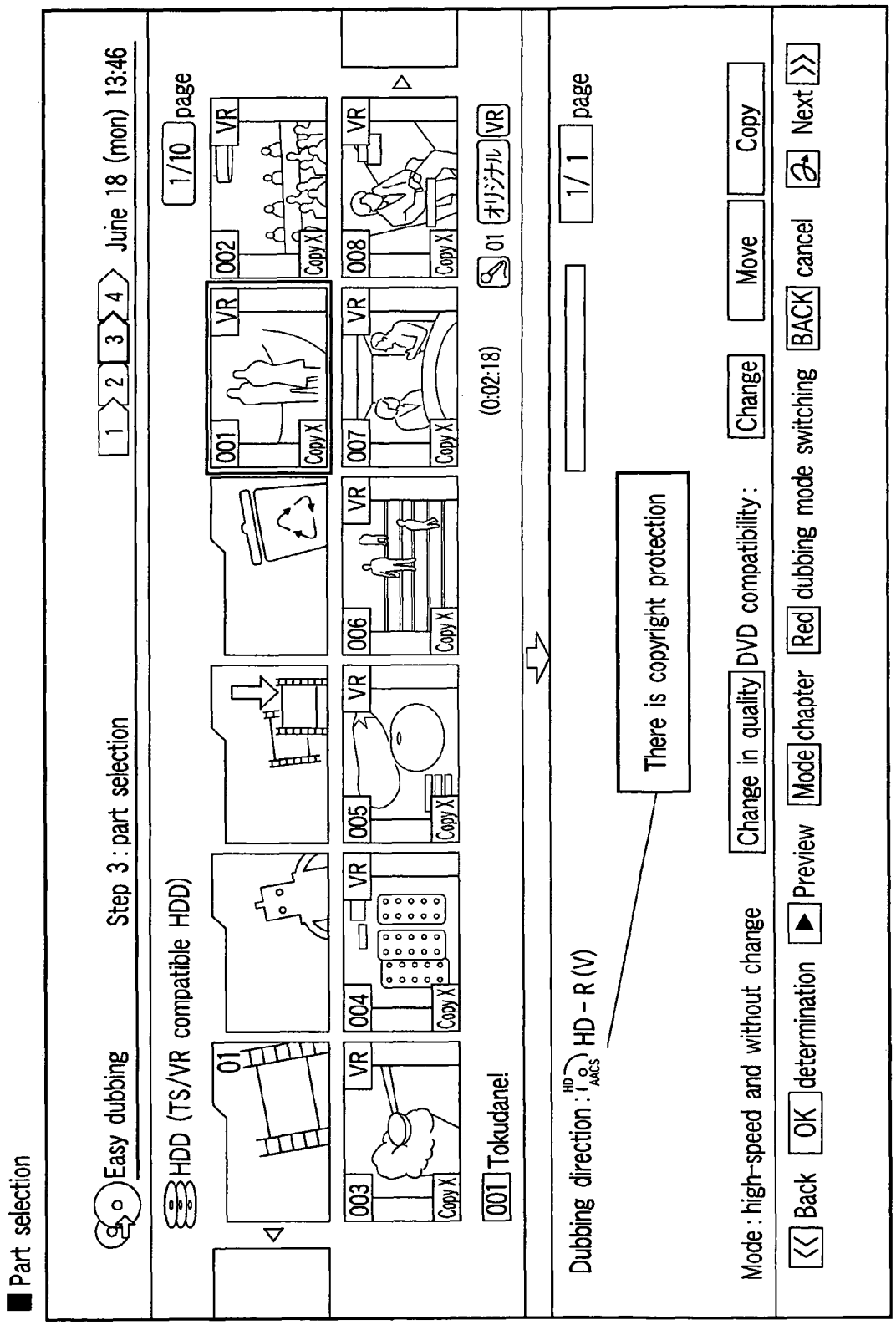
FIG. 22 is a view showing an example of the part selection screen with the presence of the copyright protection information displayed therein, according to the recording device of one embodiment of the invention.
Figure 25:
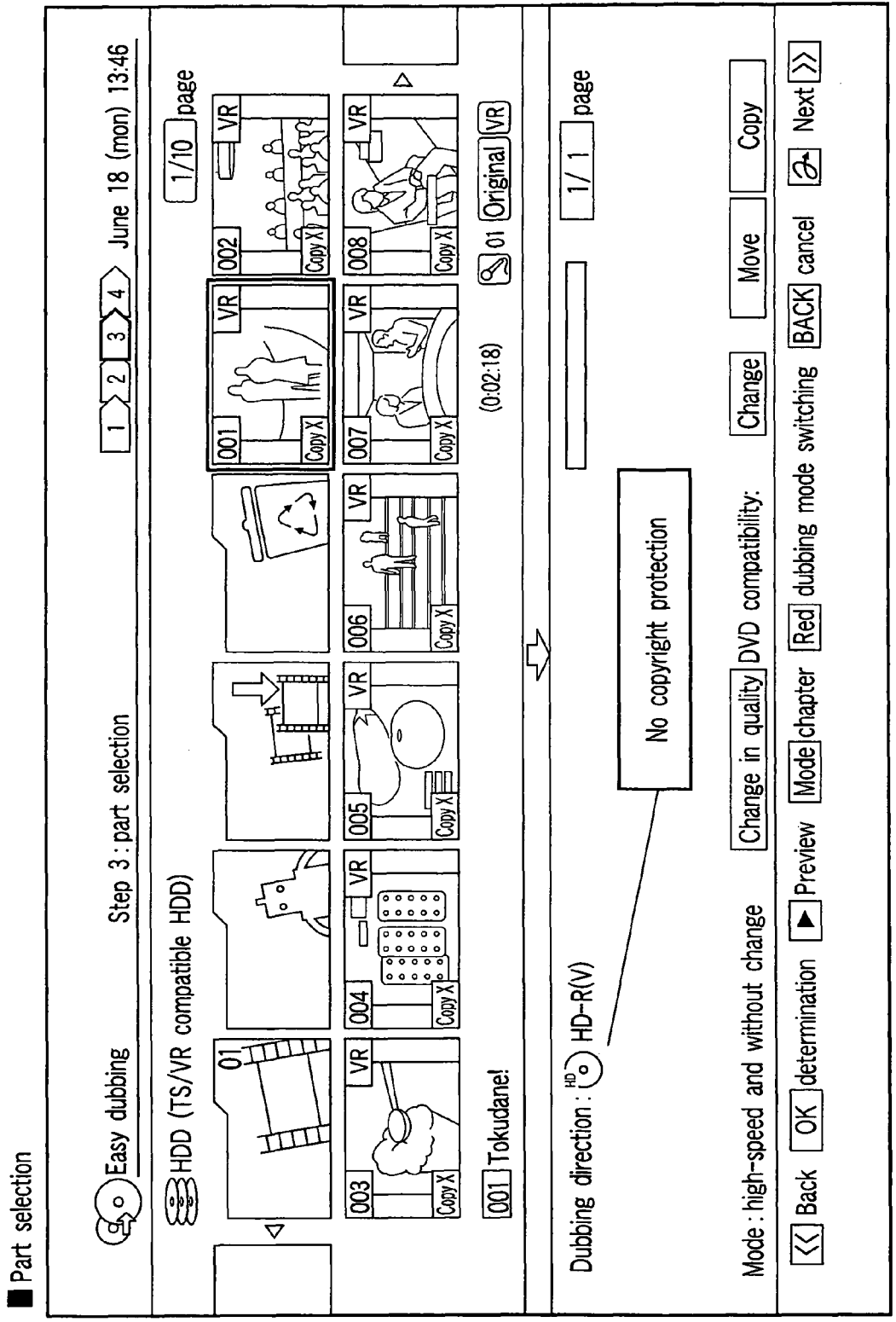
FIG. 25 is a view showing an example of the part selection screen with the absence of the copyright protection information displayed therein, according to the recording device of one embodiment of the invention.
Figure 26:
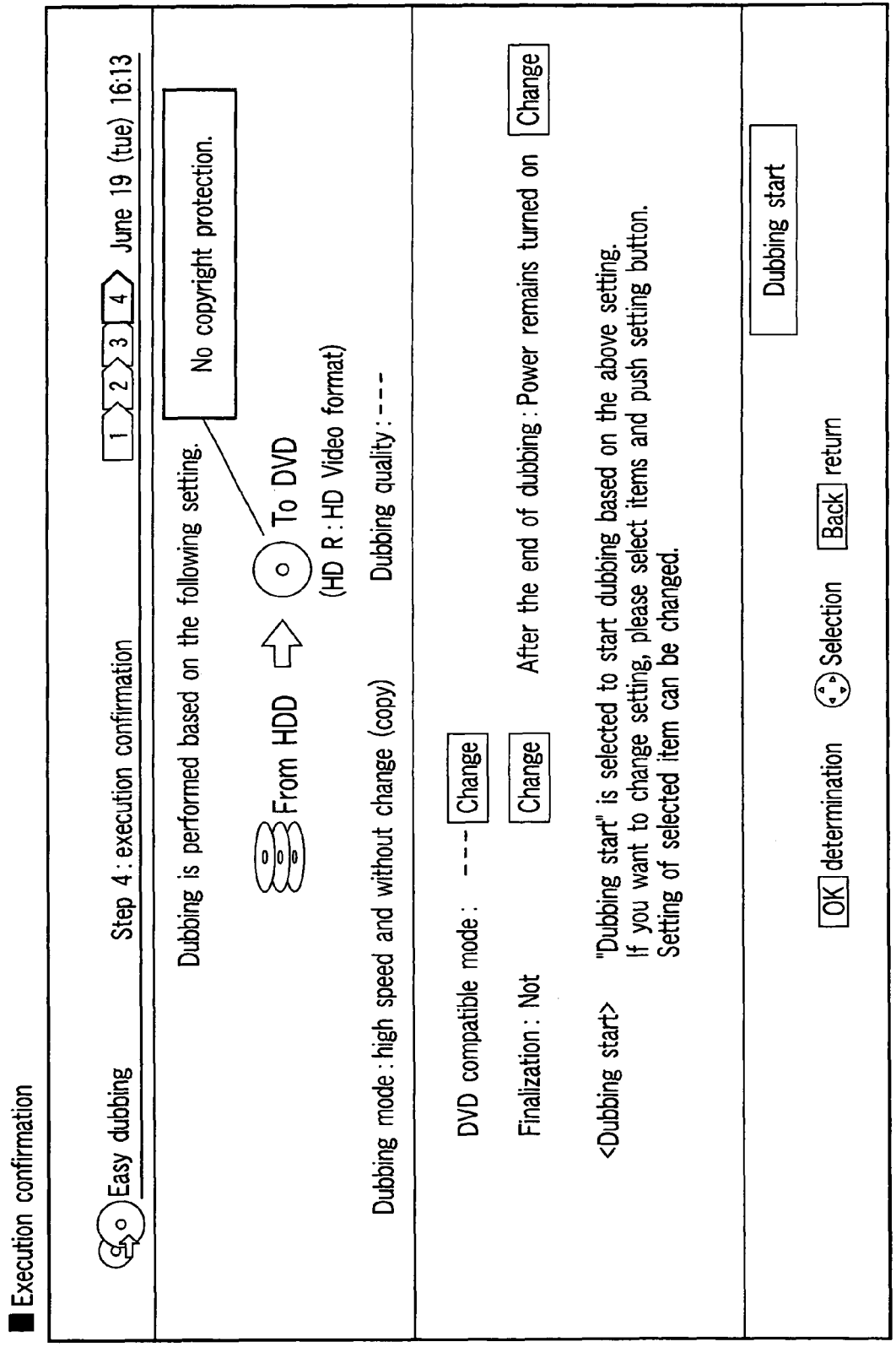
FIG. 26 is a view showing an example of the execution confirmation screen with the absence of the copyright protection information displayed therein, according to the recording device of one embodiment of the invention.
Figure 29:
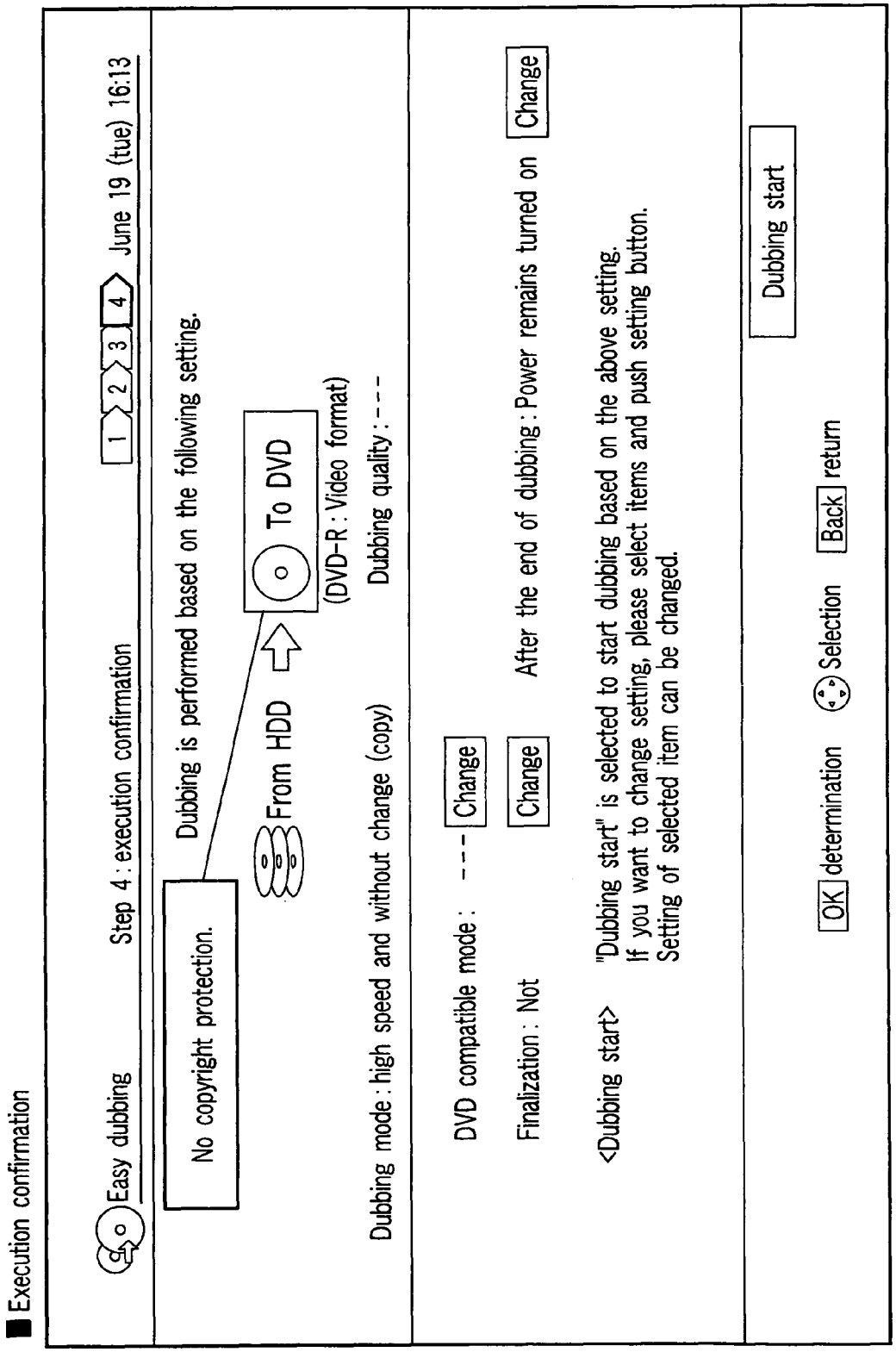
FIG. 29 is a view showing an example of the execution confirmation screen with the absence of the copyright protection information displayed therein, according to the recording device of one embodiment of the invention.

Next, a dubbing operation screen displayed after the selection of a format will be described using the drawings. FIG. 10 shows an example of the part selection screen with the presence of the copyright protection information displayed therein, according to the recording device of one embodiment of the invention. FIG. 11 shows an example of an execution confirmation screen with the presence of the copyright protection information displayed therein, according to the recording device of one embodiment of the invention. FIG. 13 shows an example of the part selection screen with the absence of the copyright protection information displayed therein, according to the recording device of one embodiment of the invention. FIG. 14 shows an example of the execution confirmation screen with the absence of the copyright protection information displayed therein, according to the recording device of one embodiment of the invention. FIG. 16 shows an example of the part selection screen with the presence of the copyright protection information displayed therein, according to the recording device of one embodiment of the invention. FIG. 17 shows an example of the execution confirmation screen with presence of the copyright protection information displayed therein, according to the recording device of one embodiment of the invention. FIG. 19 shows an example of the part selection screen with the absence of the copyright protection information displayed therein, according to the recording device of one embodiment of the invention. FIG. 20 shows an example of the execution confirmation screen with the absence of the copyright protection information displayed therein, according to the recording device of one embodiment of the invention. FIG. 22 shows an example of the part selection screen with the presence of the copyright protection information displayed therein, according to the recording device of one embodiment of the invention. FIG. 23 shows an example of the execution confirmation screen with the presence of the copyright protection information displayed therein, according to the recording device of one embodiment of the invention. FIG. 25 shows an example of the part selection screen with the absence of the copyright protection information displayed therein, according to the recording device of one embodiment of the invention. FIG. 26 shows an example of the execution confirmation screen with the absence of the copyright protection information displayed therein, according to the recording device of one embodiment of the invention. FIG. 28 shows an example of the part selection screen with the absence of the copyright protection information displayed therein, according to the recording device of one embodiment of the invention. FIG. 29 shows an example of the execution confirmation screen with the absence of the copyright protection information displayed therein, according to the recording device of one embodiment of the invention.

A dubbing operation screen, which is generated by the blank medium copyright protection information detection section 13, the blank medium copyright protection information display processing section 14, the restriction display processing section 15, the processing section 16 for comparing a selected format and the copyright protection information, and the copyright protection information display processing section 17 corresponding to the selected format, all included in the control section 12, will be hereinafter described in detail.

VR Format 1

First, the part selection screen and the execution confirmation screen in which the VR format is selected and there is the copyright protection information will be described. After the format is selected from the format selection screen of FIG. 8, the control section 12 generates the part selection screen shown in FIG. 10 to specify a part to be dubbed (step S21). Also in this screen, the presence of the copyright protection information such as CPRM is displayed.

After the specification of the part to be dubbed, the control section 12 displays the contents of the final dubbing processing in the execution confirmation screen of FIG. 11 to wait for selection by a user (step S22). Also in this part selection screen, the copyright protection information such as CPRM is displayed.

VR Format 2

Next, the part selection screen and the execution confirmation screen in which the VR format is selected and there is no copyright protection information will be described. After the format is selected from the format selection screen of FIG. 12, the control section 12 generates the part selection screen shown in FIG. 13 to specify a part to be dubbed (step S23). Also in this screen, the absence of the copyright protection information is displayed, and at the same time, a restriction description of recording in the case where there is no copyright protection information is displayed.

After the specification of the part to be dubbed, the control section 12 displays the contents of the final dubbing processing in the execution confirmation screen of FIG. 14 to wait for selection by a user (step S24). Also in this screen, the absence of the copyright protection information is displayed, and at the same time, the restriction description of recording in the case where there is no copyright protection information is displayed.

HDVR Format 1

Next, the part selection screen and the execution confirmation screen in which the HDVR format is selected and there is the copyright protection information will be described. After the format is specified from the format selection screen of FIG. 15, the control section 12 generates the part selection screen shown in FIG. 16 to specify a part to be dubbed (step S25).

After the specification of the part to be dubbed, the control section 12 displays the contents of the final dubbing processing in the execution confirmation screen of FIG. 17 to wait for selection by a user (step S26). Also in this screen, the copyright protection information such as AACS is displayed.

HDVR Format 2

Figure 18:
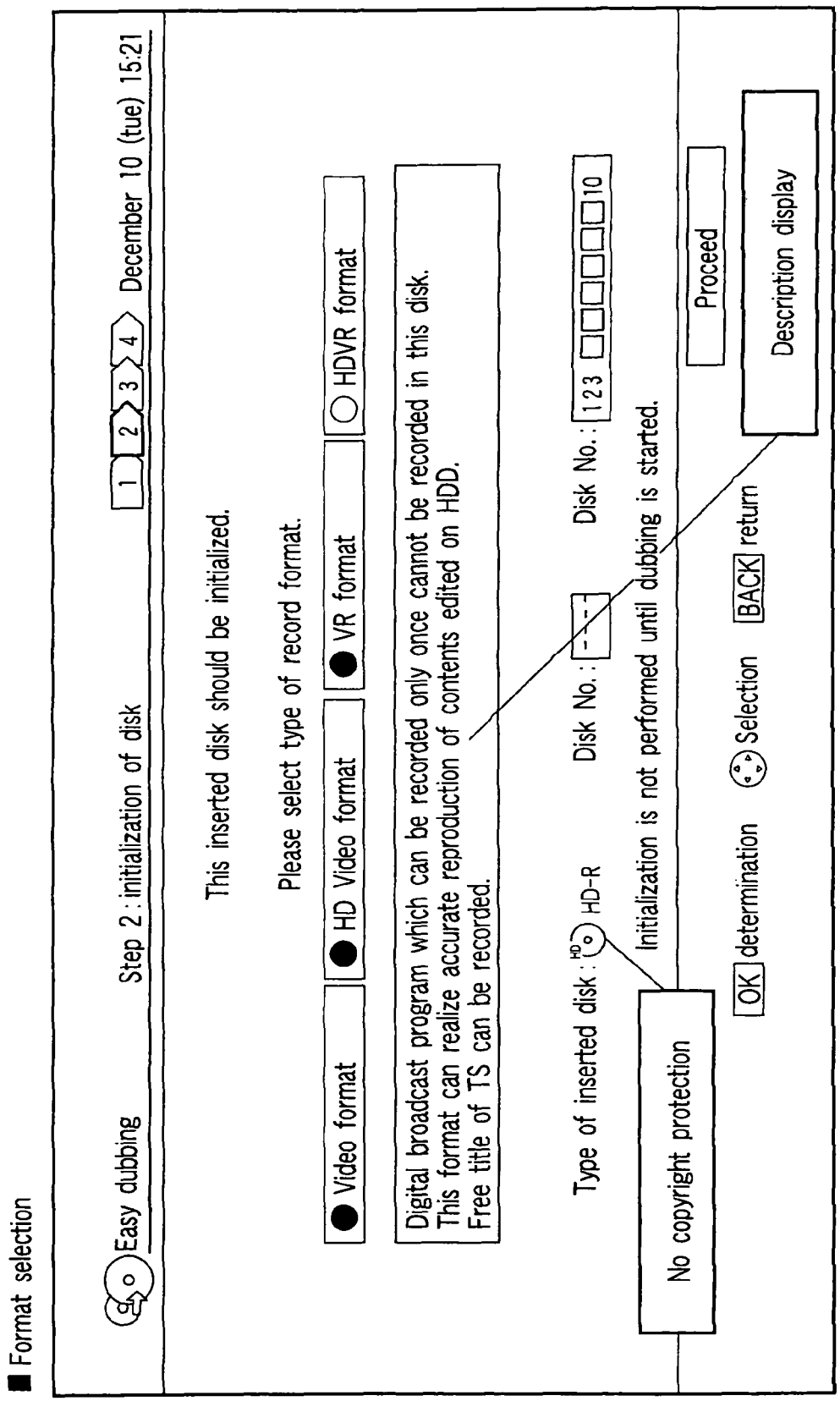
FIG. 18 is a view showing an example of the format selection screen with the absence of the copyright protection information displayed therein, according to the recording device of one embodiment of the invention.

Next, the part selection screen and the execution confirmation screen in which the HDVR format is selected and there is no copyright protection information will be described. After the format is selected from the format selection screen of FIG. 18, the control section 12 generates the part selection screen shown in FIG. 19 to specify a part to be dubbed (step S27). Also in this screen, the absence of the copyright protection information is displayed, and at the same time, a restriction description of recording in the case where there is no copyright protection information is displayed.

After the specification of the part to be dubbed, the control section 12 displays the contents of the final dubbing processing in the execution confirmation screen of FIG. 20 to wait for selection by a user (step S28). Also in this screen, the absence of the copyright protection information is displayed, and at the same time, the restriction description of recording in the case where there is no copyright protection information is displayed.

HD Video Format 1

Figure 21:
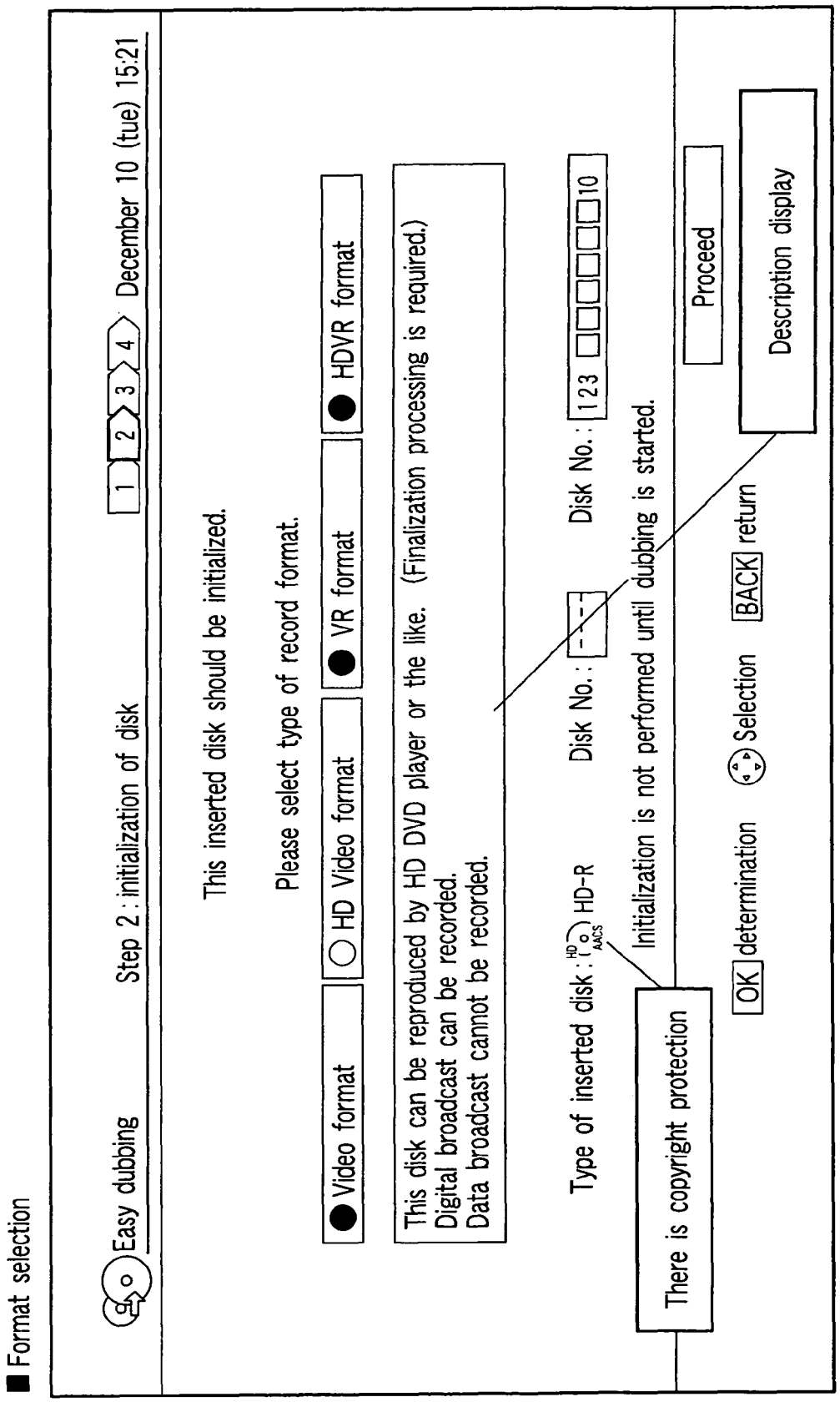
FIG. 21 is a view showing an example of the format selection screen with the presence of the copyright protection information displayed therein, according to the recording device of one embodiment of the invention.

Next, the part selection screen and the execution confirmation screen in which HD Video format is selected and there is the copyright protection information will be described. After the format is specified from the format selection screen of FIG. 21, the control section 12 generates the part selection screen shown in FIG. 22 to specify a part to be dubbed (step S29). Also in this screen, the presence of the copyright protection information such as AACS is displayed.

After the part to be dubbed is specified in the part selection screen of FIG. 22, the control section 12 further displays the contents of the final dubbing processing in the execution confirmation screen of FIG. 23 to wait for selection by a user (step S30). Also in this screen, the presence of the copyright protection information such as AACS is displayed.

HD Video Format 2

Figure 24:
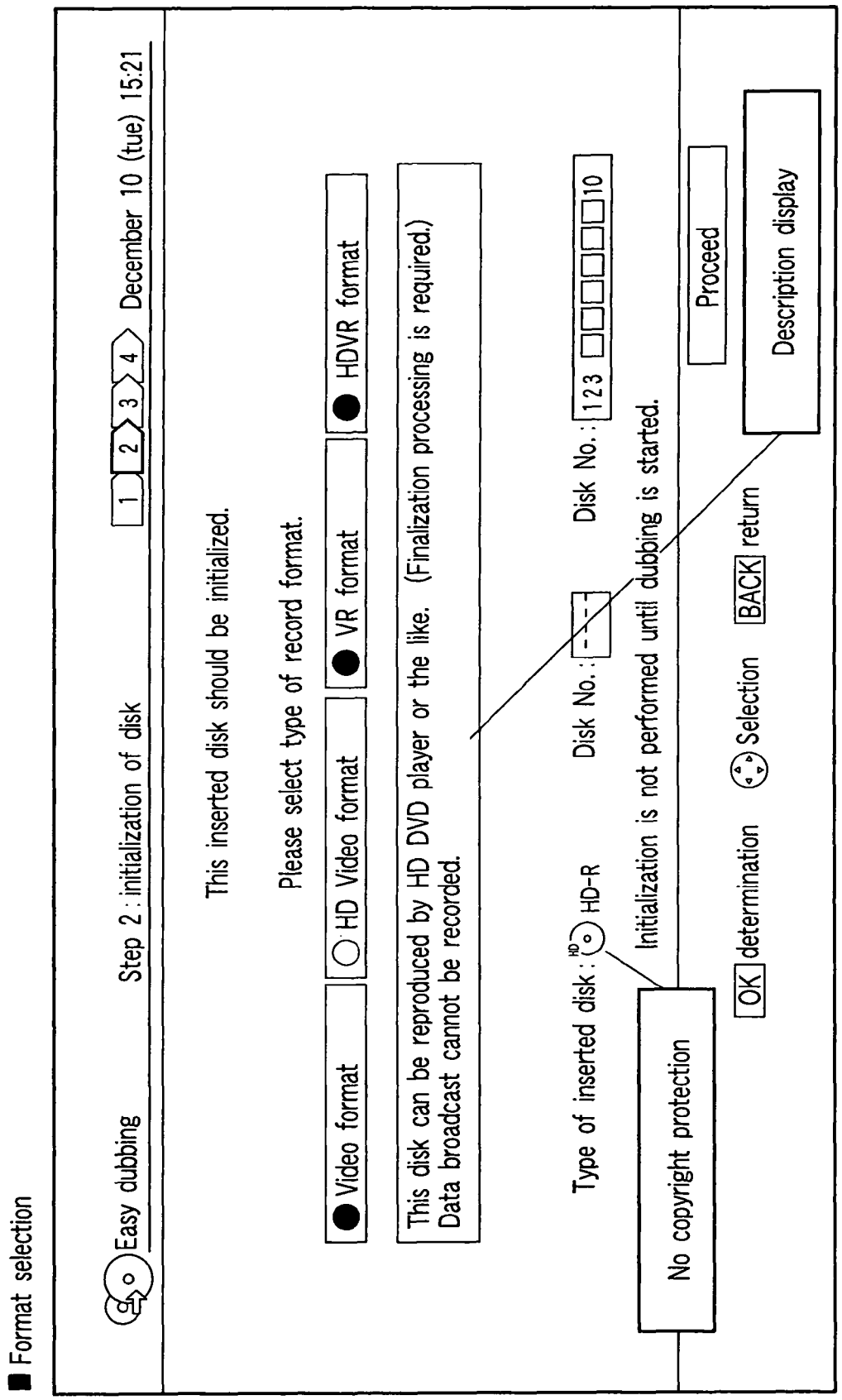
FIG. 24 is a view showing an example of the format selection screen with the absence of the copyright protection information displayed therein, according to the recording device of one embodiment of the invention.

Next, the part selection screen and the execution confirmation screen in which the HD Video format is selected and there is no copyright protection information will be described. After the format is selected from the format selection screen of FIG. 24, the control section 12 generates the part selection screen shown in FIG. 25 to specify a part to be dubbed (step S31). Also in this screen, the absence of the copyright protection information is displayed, and at the same time, a restriction description of recording in the case where there is no copyright protection information is displayed.

After the specification of the part to be dubbed, the control section 12 displays the contents of the final dubbing processing in the execution confirmation screen of FIG. 26 to wait for selection by a user (step S32). Also in this screen, the absence of the copyright protection information is displayed, and at the same time, the restriction description of recording in the case where there is no copyright protection information is displayed.

Video Format

Figure 27:
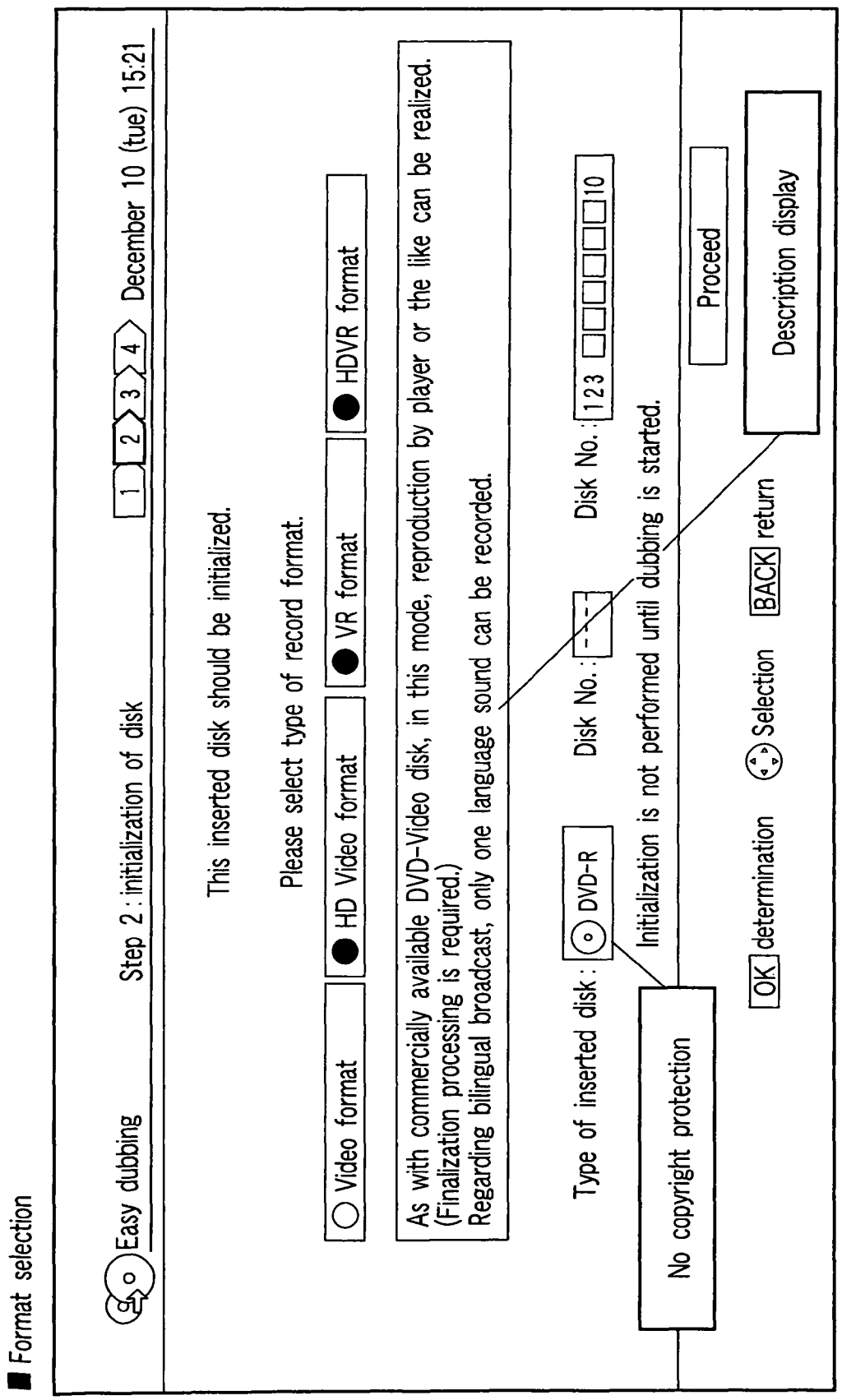
FIG. 27 is a view showing an example of the format selection screen with the absence of the copyright protection information displayed therein, according to the recording device of one embodiment of the invention.

Next, the part selection screen and the execution confirmation screen in which the Video format is selected will be described. In the Video format, the habitual absence of the copyright protection information is displayed. After the format is specified from the format selection screen of FIG. 27, the control section 12 generates the part selection screen shown in FIG. 28 to specify a part to be dubbed (step S33). Also in this screen, the absence of the copyright protection information is displayed.

After the specification of the part to be dubbed, the control section 12 displays the contents of the final dubbing processing in the execution confirmation screen of FIG. 29 to wait for selection by a user (step S34). Also in this screen, the absence of the copyright protection information is displayed.

As above, in the optical disk device 10 according to one embodiment of the invention, it is possible to, after the selection of the dubbing function, determine whether the optical disk D, which is an unformatted blank medium, is a medium having the copyright protection information in the dubbing direction selection screen. The copyright protection information of the inserted medium is displayed, whereby the user can confirm whether a copy-once title can be recorded in an unformatted optical disk. Accordingly, the user's understanding of the device and the improvement in the operability of the device can be realized.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An optical disk device comprising:
  a disk drive which applies recording processing and reproduction processing to an optical disk; and
  a control section which detects, as copyright protection information, a medium ID and a medium key block of an unformatted optical disk inserted into the disk drive and displays the presence or absence of copyright protection information in the optical disk on the basis of the detection result,
wherein the control section displays a plurality of formats relating to the optical disk and displays the presence or absence of the copyright protection information corresponding to a selected format.

2. The optical disk device according to claim 1, wherein the control section discriminates a type of the optical disk and, when said plurality of formats of the optical disk are displayed, displays a format as default based on the discrimination result.

3. The optical disk device according to claim 1, wherein the control section displays a format as default depending on the detected copyright protection information.

4. The optical disk device according to claim 1, wherein, even when the medium ID and the medium key block are detected, the control section does not display the copyright protection information depending on the selected format.

5. The optical disk device according to claim 1, wherein the control section displays the copyright protection information of the optical disk, and at the same time, displays a restriction in the recording processing applied to the optical disk.

6. The optical disk device according to claim 1, wherein the control section displays that the copyright protection information is AACS when the optical disk is an HD DVD.

7. The optical disk device according to claim 1, wherein the control section displays that the copyright protection information is CPRM when the optical disk is a DVD.

8. A method for processing an optical disk, comprising:
detecting a medium ID and a medium key block as copyright protection information from an unformatted optical disk inserted into a disk drive;
displaying the presence or absence of the copyright protection information in the optical disk on the basis of the detection result;
displaying a plurality of formats relating to the optical disk; and
displaying the presence or absence of the copyright protection information corresponding to a selected format.

9. An optical disk device comprising:
a disk drive which applies recording processing and reproduction processing to an optical disk; and
a control section which detects, as copyright protection information, a medium ID and a medium key block of an unformatted optical disk inserted into the disk drive and displays the presence or absence of copyright protection information in the optical disk on the basis of the detection result,
wherein, even when the medium ID and the medium key block are detected, the control section does not display the copyright protection information depending on the selected format.

10. The optical disk device according to claim 9, wherein the control section displays a plurality of formats relating to the optical disk and displays the presence or absence of the copyright protection information corresponding to a selected format.

11. The optical disk device according to claim 10, wherein the control section discriminates a type of the optical disk and, when said plurality of formats of the optical disk are displayed, displays a format as default based on the discrimination result.

12. The optical disk device according to claim 9, wherein the control section displays a format as default depending on the detected copyright protection information.

13. The optical disk device according to claim 9, wherein the control section displays the copyright protection information of the optical disk, and at the same time, displays a restriction in the recording processing applied to the optical disk.

14. The optical disk device according to claim 9, wherein the control section displays that the copyright protection information is AACS when the optical disk is an HD DVD.

15. The optical disk device according to claim 9, wherein the control section displays that the copyright protection information is CPRM when the optical disk is a DVD.

* * * * *